US009917921B2

(12) United States Patent
Erola et al.

(10) Patent No.: US 9,917,921 B2
(45) Date of Patent: *Mar. 13, 2018

(54) SYSTEM, APPARATUS AND METHOD FOR CREATING SERVICE ACCOUNTS AND CONFIGURING DEVICES FOR USE THEREWITH

(75) Inventors: Esa Erola, Kauniainen (FI); Ville Warsta, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 613 days.

This patent is subject to a terminal disclaimer.

(21) Appl. No.: 12/447,035

(22) PCT Filed: Oct. 24, 2007

(86) PCT No.: PCT/IB2007/054311

§ 371 (c)(1),
(2), (4) Date: Apr. 27, 2010

(87) PCT Pub. No.: WO2008/050296

PCT Pub. Date: May 2, 2008

(65) Prior Publication Data

US 2010/0217780 A1 Aug. 26, 2010

Related U.S. Application Data

(63) Continuation-in-part of application No. 11/585,780, filed on Oct. 24, 2006.

(51) Int. Cl.
*H04L 29/08* (2006.01)
*H04L 12/58* (2006.01)
*H04M 3/42* (2006.01)

(52) U.S. Cl.
CPC .............. *H04L 67/34* (2013.01); *H04L 51/38* (2013.01); *H04M 3/42153* (2013.01)

(58) Field of Classification Search
CPC ...... H04Q 2213/13098; H04L 67/2838; H04L 47/2425; H04L 47/2475; H04L 65/1073; G06F 2221/2117
(Continued)

(56) References Cited

U.S. PATENT DOCUMENTS 5,915,214 A 6/1999 Reece et al.
5,953,398 A * 9/1999 Hill .................... H04M 15/745
379/116
(Continued)

FOREIGN PATENT DOCUMENTS

TW 560204 B 11/2003
WO WO 02/49373 A2 6/2002

OTHER PUBLICATIONS

ATT; "E-mail Configuration Settings for Gmail (Google Mail)" https://www.att.com/support_static_files/KB/KB53047.html; Apr. 25, 2006.*
(Continued)

*Primary Examiner* — Dennis Truong
(74) *Attorney, Agent, or Firm* — Ditthavong & Steiner, P.C.

(57) ABSTRACT

Systems and methods for facilitating creation of service provider accounts and configuration of devices associated therewith. Device parameters (306) are transmitted (700) from a device (302). In response, a service activation server (206) provides (308) a list of available service providers for that device (302), where the list is derived (702) using the device parameters to identify the appropriate available service providers. The device (302) enables the user (300) to select (704) a listed service provider(s), and communication is redirected (706) between the device (302) and the selected service provider (208) to enable the creation of the service account. The device (302) can then be configured for use with the established service account. Where a service
(Continued)

account already exists for the user (300), the user (300) can provide a service-related identifier (506) from which the service activation server (206) can identify an appropriate service account to be configured for use on the device (302).

20 Claims, 10 Drawing Sheets

(58) Field of Classification Search
USPC .......... 707/999.107, 802; 705/26.1; 709/206, 709/220, 227, 228, 248
See application file for complete search history.

(56) References Cited

U.S. PATENT DOCUMENTS

| | | | | |
|---|---|---|---|---|
| 6,067,568 | A * | 5/2000 | Li | H04L 41/00 709/223 |
| 6,510,515 | B1 * | 1/2003 | Raith | H04H 60/23 380/210 |
| 6,959,325 | B2 | 10/2005 | Gardner et al. | |
| 7,260,382 | B1 * | 8/2007 | Lamb | H04M 1/72525 379/207.02 |
| 7,450,927 | B1 * | 11/2008 | Creswell | H04L 12/14 455/405 |
| 8,099,078 | B2 * | 1/2012 | Lazaridis | G06Q 30/04 455/406 |
| 2002/0007412 | A1 * | 1/2002 | Paridaens | H04L 12/2854 709/229 |
| 2002/0046296 | A1 * | 4/2002 | Kloba et al. | 709/248 |
| 2002/0078185 | A1 | 6/2002 | Swerup et al. | |
| 2003/0027581 | A1 | 2/2003 | Jokinen et al. | |
| 2003/0069967 | A1 * | 4/2003 | Vincent | G06F 21/6218 709/225 |
| 2003/0107606 | A1 * | 6/2003 | Capps et al. | 345/810 |
| 2004/0006623 | A1 * | 1/2004 | Gourraud | H04L 67/16 709/227 |
| 2004/0015405 | A1 * | 1/2004 | Cloutier et al. | 705/26 |
| 2004/0082326 | A1 * | 4/2004 | Shaw et al. | 455/432.1 |
| 2004/0181580 | A1 * | 9/2004 | Baranshamaje | 709/206 |
| 2005/0015505 | A1 * | 1/2005 | Kruis et al. | 709/229 |
| 2005/0038857 | A1 | 2/2005 | Gardner et al. | |
| 2005/0079863 | A1 * | 4/2005 | Macaluso | H04W 4/00 455/419 |
| 2005/0114670 | A1 | 5/2005 | Bowe et al. | |
| 2005/0239447 | A1 * | 10/2005 | Holzman et al. | 455/414.3 |
| 2006/0136990 | A1 * | 6/2006 | Hinton | H04L 63/0815 726/2 |
| 2006/0236325 | A1 * | 10/2006 | Rao | G06F 8/65 719/315 |
| 2007/0042756 | A1 * | 2/2007 | Perfetto | H04M 3/42263 455/412.1 |
| 2007/0044143 | A1 * | 2/2007 | Zhu | G06F 21/33 726/8 |
| 2007/0078934 | A1 * | 4/2007 | Gardner | G06Q 10/107 709/206 |
| 2007/0101412 | A1 * | 5/2007 | Yang | G06F 21/305 726/5 |
| 2007/0143449 | A1 * | 6/2007 | Wray West | H04M 1/247 709/219 |
| 2007/0259683 | A1 | 11/2007 | Hartikainen et al. | |
| 2008/0040490 | A1 * | 2/2008 | Karlberg | G06F 8/61 709/228 |
| 2008/0046349 | A1 | 2/2008 | Elberg et al. | |
| 2008/0096507 | A1 * | 4/2008 | Erola | 455/187.1 |
| 2012/0117626 | A1 * | 5/2012 | Yates | H04L 9/3213 726/4 |

OTHER PUBLICATIONS

Office Action for Chinese Application No. 200780039480.0 dated May 3, 2012, pp. 1-10.
Canadian Office Action for related Canadian Patent Application No. 2,665.020 dated Feb. 6, 2012, pp. 1-2.
Office Action for related Canadian Patent Application No. 2,665,020 dated Nov. 13, 2012, pp. 1-2.
Fourth Office Action with English Summary for Chinese Application No. 200780039480.0, dated May 22, 2013, pp. 1-7.
Office Action for corresponding Chinese Patent Application No. 200780039480.0, dated Sep. 4, 2013, 8 pages (English Language Summary included).
Office Action for corresponding Vietnamese Patent Application No. 1-2009-01049, dated Oct. 2, 2013, 2 pages.
Office Action with English Summary for Chinese Patent Application No. 200780039480.0, dated Jan. 29, 2013, pp. 1-5.
Final Rejection for related U.S. Appl. No. 12/447,035, dated Aug. 13, 2012, pp. 1-26.
Office Action for related Patent Application No. 1964/CHENP/2009, dated Apr. 17, 2014, 2 Pages.

* cited by examiner

SYSTEM, APPARATUS AND METHOD FOR CREATING SERVICE ACCOUNTS AND CONFIGURING DEVICES FOR USE THEREWITH

RELATED APPLICATION

This application was originally filed as PCT Application No. PCT/IB2007/054311 filed Oct. 24, 2007, which claims priority to U.S. application Ser. No. 11/585,780 filed Oct. 24, 2006.

FIELD OF THE INVENTION

This invention relates in general to mobile communications, and more particularly to systems, apparatuses and methods for facilitating creation of service provider accounts and configuration of devices associated therewith.

BACKGROUND OF THE INVENTION

Advances in communication infrastructures and devices have turned standard communication devices into versatile communication tools. People communicate with each other, and with other electronic devices, over networks ranging from Local Area Networks (LANs) to wide reaching Global Area Networks (GANs) such as the Internet. Wireless communications devices such as mobile phones, personal digital assistants (PDAs), and the like are often designed to interface with such networks as well as with their local surroundings using short-range wireless technologies.

Today, such wireless devices are being used for a variety of different types of communication. For example, current and anticipated mobile phone technologies have transformed wireless devices into powerful tools capable of capturing and communicating voice, data, images, video, and other multimedia content. Mobile phones, at one time solely a voice communication tool, now often typically include data messaging capabilities such as text messaging such as short message service (SMS), multimedia messaging, instant messaging, e-mail, voice over internet protocol (VoIP), etc.

However, these messaging capabilities often require corresponding messaging accounts. For example, a mobile phone user who wants to send and/or receive e-mails via his/her mobile phone must establish some e-mail account in order to engage in e-mail communication. However, there are a high number of individuals who do not have a prior e-mail account, or who do not have a personal computer whereby an existing e-mail account/address would be likely. This is particularly true in developing markets. Also, there are individuals who may already have an e-mail account(s) established, but do not want to use that e-mail account on a mobile device and therefore want to have another e-mail box with the mobile device. Thus, these people have to take action to determine with whom an account can be created, and how to configure any such account. There are also security concerns with current configuration methodologies, as a malicious configuration package may arrive at the device, and the user faces a potentially serious risk.

Another problem primarily affects mobile device users, where user interface mechanisms may be more difficult to manipulate. For example, many mobile phones do not have a standard keyboard (e.g., QWERTY keyboard), but rather have a numeric keypad with alpha character capabilities. It can be difficult and time-consuming to enter the information required to establish a new service account or configure an account via such a limited UI device. These limitations can also complicate activating an existing e-mail account on such a device.

Accordingly, there is a need in the industry for a manner of efficiently and easily establishing and/or configuring service accounts on communication devices. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses systems, apparatuses and methods for facilitating creation of service provider accounts and configuration of devices associated therewith.

A method according to one embodiment of the invention involves transmitting one or more parameters associated with a device, and in response, receiving a list of service providers. The list is derived, using the transmitted parameters, from a set of service providers. Selection of a service provider(s) is enabled, and communication with the selected service provider is then facilitated in order to create a service account with the selected service provider.

In a more particular embodiment of such a method, a selectable option is presented to create a new service account or to bypass creation of a new service account and configure an existing service account for use on the device. In one embodiment, selection of the option to configure an existing service account is recognized, and in response a service account identifier is provided that is indicative of an existing service provider of the existing service account. Configuration data associated with the existing service provider is received, and the device is configured to operate with the existing service provider using the received configuration data. In another particular embodiment, the existing service account is an existing e-mail account. In such case, providing a service account identifier indicative of an existing service provider of the existing service account involves providing an e-mail address associated with the existing e-mail account. In yet another embodiment, communication is redirected to the existing service provider to authenticate a user of the device for the existing service account. In such case, receiving configuration data associated with the existing service provider involves receiving the configuration data if the user of the device is authenticated for the existing service account.

In other particular embodiments of the method, a network address is associated with each of the service providers in the list, where facilitating communication with the selected service provider involves communicating with the selected service provider at the network address of the selected service provider. In another embodiment, facilitating communication with the selected service provider involves directing a browser application on the device to a network address of the selected service provider to create the service account with the selected service provider. In yet another embodiment, facilitating communication with the selected service provider involves presenting a web page(s) provided by the selected service provider, enabling entry of account data associated with the user/device, and communicating the account data to the selected service provider to facilitate the creation of the service account.

Still other embodiments of the method involve automatically transmitting parameters associated with the device with a request to create the service account in response to an attempt to invoke a client not yet configured for use with the selected service provider. Another embodiment further involves configuring the device with configuration data obtained in response to the creation of the new service account.

One embodiment of the method includes receiving a contact record including at least a user-service identifier (e.g., e-mail address, VoIP address, SIP address, etc.) identifying a user of the device for the created service account, and storing the received contact record in a contacts database. In an alternative embodiment, such a contact record is created at the device when the user-service identifier is received.

Yet another embodiment involves receiving a contact record including at least identification information resulting from the creation of the service account, and modifying at least one existing local contact record with the information from the received contact record. Thus, an existing contact record(s) at the device may be updated in lieu of, or in addition to, creating a new contact record(s) at the device. Another embodiment involves receiving a contact record including at least identification information resulting from the creation of the service account, and creating a new local contact record from the received contact record.

In accordance with another embodiment of the invention, a method is provided that involves receiving first parameters associated with a device, and in response deriving a list of service providers from a set of service providers. The list is provided to the device. Second parameters are received, where these second parameters are associated with a service account established between the device and a device-selected one of the service providers from the list. Configuration data is created based on the first and second parameters, and the configuration data is provided to the device.

In a more particular embodiment, the method further involves enabling a selectable option for the device to create a new service account or to bypass creation of a new service account and configure an existing service account for use on the device. In response to selection of an option to configure an existing service account, a service account identifier is received. A messaging provider corresponding to the service account identifier is identified. Configuration data capable of configuring the device for use with the existing service account is created, and transmitted to the device.

A more particular embodiment of such a method further involves directing the device to communicate with the service provider corresponding to the service account identifier to authenticate a user of the device for the existing service account. In yet another embodiment, the service account identifier includes a messaging address, the existing service account includes an existing messaging account, and the service provider includes a messaging provider.

In other embodiments of such a method, deriving a list of service providers involves comparing the first parameters to the set of service providers, and creating the list based on those service providers that correspond to the first parameters. Another embodiment further involves associating network addresses for each respective service provider in the list. Still another embodiment involves signing the configuration data prior to providing the configuration data to the device.

Another embodiment of the method involves creating a contact record including at least a user-service identifier corresponding to the established service account, and providing the contact record to the device. In yet another embodiment, a test mode may be invoked in response to receiving a test identifier, during which testing the service provider being tested is concealed from the derived list, and proper service establishment is then tested. Still another embodiment includes providing, to the device, at least one software module related to the service associated with the established service account.

In accordance with another embodiment of the invention, a communication device is provided. The device includes a transmitter to transmit parameters associated with the device, and a receiver to receive a list of service providers derived using the transmitted parameters. A user interface is configured to enable user selection of a service provider(s) in the list. A processor is configured to recognize selection of at least one of the service providers in the list, and to facilitate creation of a service account with the selected service provider.

In more particular embodiments, the processor is further configured to initiate a browser module directed to a network address of the selected service provider to enable user interaction therewith to create the service account with the selected service provider. In another embodiment, the processor is configured to recognize an attempt to invoke a non-configured client module, and in response direct the transmitter to automatically transmit the one or more parameters associated with the device. Another embodiment involves the processor being configured to activate the device with configuration data obtained in response to the creation of the new service account. The communication device may be any type of device capable of communicating, such as a mobile phone, personal digital assistant, computing device, etc.

In accordance with another embodiment of the invention, a network element is provided. The network element, such as a server, includes a receiver to receive first parameters associated with a device. A processor is configured to derive a list of service providers from a set of service providers using the first parameters. A transmitter is used to provide the list to the device. The receiver further receives second parameters associated with a service account established between the device and a selected one of the service providers from the list. The processor is further configured to create configuration data for the device based on the first and second parameters. In one particular embodiment of such a network element, the processor is further configured to create a contact record including at least a user-service identifier identifying a user of the device for the established service account.

In accordance with another embodiment of the invention, a communication device is provided that includes a transmitter to transmit a service-related identifier associated with an existing service account, and a receiver to receive configuration data associated with a service provider identified by the service-related identifier. A processor configures the communication device to operate with the service provider using the received configuration data.

In accordance with another embodiment of the invention, a computer-readable medium is provided, having instructions stored thereon which are executable by a computer system for creating a service account capable of use by a communication device. The computer-executable instructions enable the identification of one or more device parameters to be transmitted, and the presentation of a list of service providers, where the list is derived from a set of service providers, the derivation being performed using one or more of the parameters. The instructions further enable user selection of a service provider(s) in the list, and facilitate communication with the selected service provider to create a service account with the selected service provider.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

FIG. 4, including

FIG. 6, including

DETAILED DESCRIPTION OF EMBODIMENTS OF THE INVENTION

A portion of the disclosure of this patent document contains material which is subject to copyright protection. The copyright owner has no objection to the facsimile reproduction by anyone of the patent document or the patent disclosure, as it appears in the U.S. Patent & Trademark Office patent file or records, but otherwise reserves all copyright rights whatsoever.

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides systems, apparatuses and methods for facilitating the creation of service provider accounts and configuration of devices associated therewith. For example, the invention facilitates the creation of a new account for services such as, for example, e-mail, voice-over-Internet-Protocol (VoIP), wireless local area network (WLAN), photo sharing, etc. As indicated above new e-mail service is one service in which the invention can be used, to make it easy and convenient for users to establish e-mail messaging on their mobile devices. In addition to creating new e-mail and other service accounts, one embodiment includes an activation service mechanism for activating an existing e-mail account in such devices. This also provides service providers with a straightforward manner of acquiring new and active users.

While the following description concentrates on an e-mail embodiment as a representative application to which the present invention is applicable, this is only for purposes of explanation. The present invention is equally applicable to other services such as, for example, e-mail, voice-over-Internet-Protocol (VoIP), wireless local area network (WLAN), photo sharing, etc. Those skilled in the art can determine from the description provided herein that the embodiments directed to e-mail applications are equally applicable to other applications and services also involving initial activation. The invention is therefore not limited to the particular, representative embodiments described below.

Figure 1:
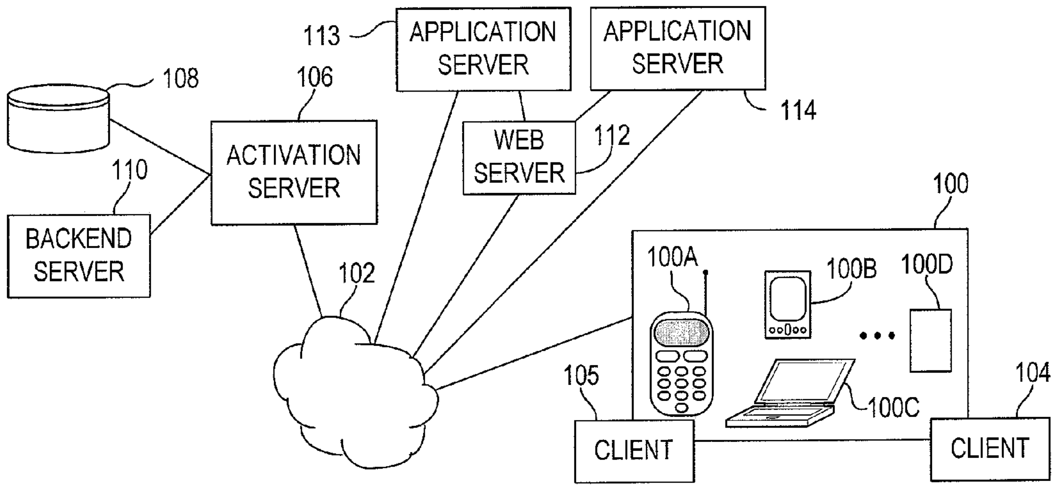
FIG. 1 is a block diagram generally illustrating a representative network environment in which the principles of the present invention may be applied.

FIG. 1 is a block diagram generally illustrating a representative network environment in which the principles of the present invention may be applied. The device that may be seeking the creation and/or configuration of a service account can be any device capable of communicating (i.e., sending and/or receiving) information over a landline and/or wireless network(s). In the embodiment of FIG. 1, the representative device that is seeking the creation and/or configuration of a service account is a mobile device 100, such as a mobile phone 100A, personal digital assistant 100B, laptop computer 100C, or other computing device 100D. The representative network 102 represents any suitable wireless and/or landline networks that can facilitate the communication of information to and from the device 100 with an application such as an email client, VoIP client, photo capture and publishing client, etc. For example, the network 102 may represent a GSM/GPRS network that also communicates with the Internet and/or other landline networks to ultimately connect wireless devices 100 with servers and other resources available via the Internet. As another representative example, the network 102 may include a wireless local area network infrastructure. These are merely representative examples, as the network 102 may represent any one or more networks capable of operating with one another to communicate information to and/or from the device 100.

One use example involves the user of the device 100 invoking a local application, e.g., client 104, that is not yet configured for use. For example, the client 104 may represent an e-mail client, where in accordance with the invention the user attempts to open this program and is notified that the e-mail account is not yet set up. In accordance with the invention, another client 105 (which may or may not be integral to the client 104) may be automatically aware of the location of an activation server 106 to which a list of e-mail (or other relevant service) providers can be retrieved based on particular parameters associated with the device 100. The activation server 106 may itself store the list of e-mail providers, or may obtain it from elsewhere such as from an associated database 108, backend server 110, etc. Depending on which provider is selected by the user, the device 100 browser or other access application is directed to the selected provider's server 112 (e.g., website or other addressable network location). The service activation enables the email client to communicate with the appropriate servers, such as servers 113 and 114. These servers 113, 114 represent servers such as, for example, an IMAP server, POP server, SMTP server, or other relevant server that may be used when the application server represents an "e-mail" server.

It should be noted that some of these servers 113, 114 may be the e-mail provider's servers, or the network operator's servers. For example, an SMTP server may be the e-mail provider's server, or that of the mobile operator or internet service provider (ISP). In cases where a mobile device capable of communicating via a cellular infrastructure does not have a WLAN or other network interface beyond a cellular network interface, it may be preferable to configure the operator's SMTP address.

When directed to the selected provider, the user will have the ability to create an account (if one does not already exist) with that selected provider. In one embodiment, the user device 100 may then receive a link or other automatic or selectable option to cause the device to be automatically configured to the new account. In one embodiment, the user is presented with a main menu, new e-mail box, and/or other relevant starting point for the messaging client 104. In this manner, the device 100 can easily create a new service account and can be automatically configured for use with that new service account.

Figure 2:
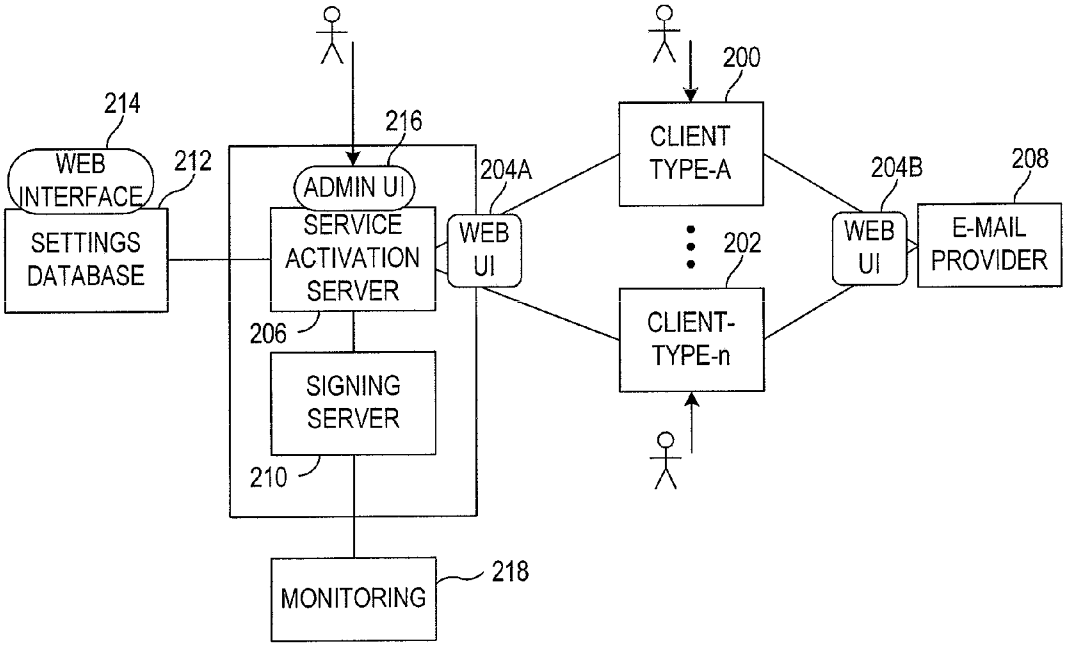
FIG. 2 is a block diagram generally illustrating a representative network environment in which the principles of the present invention may be applied to initiate an e-mail application on a mobile device.

FIG. 2 is a block diagram generally illustrating a representative network environment in which the principles of the present invention may be applied to initiate an e-mail application on a mobile device. As previously described, getting the e-mail settings right for communication devices, and particularly wireless/mobile devices, is often tedious for end users. It can become particularly complicated if the end user does not have any existing e-mail accounts, or wants to set up a new e-mail account specifically for use on the mobile device. This may be the case, for example, in emerging markets. In addition to assisting with establishing a new service provider, the invention provides support for end users wanting to choose among multiple e-mail service providers.

The embodiment of FIG. 2 involves, among other things, the distribution of new e-mail accounts (or other application accounts) on behalf of email providers (or other service providers) through a communication device such as a mobile phone, PDA or other handset. As indicated above, the invention is applicable to numerous services and associated accounts, such as e-mail, VoIP, photo sharing, etc. For example, in a VoIP situation, the user may obtain a VoIP account from a service provider, and the device client is automatically configured. Alternatively, the user may first get credentials to a WLAN network and then a VoIP account where VoIP is an application on top of WLAN. In another embodiment, the user may create an account for a photo sharing application whereby the camera application asks if the user wants to get an account to Photo-Company-A in America, or Photo-Company-B in Finland, etc.

A general use case, i.e. obtaining an e-mail account on a mobile device, is described in connection with FIG. 2. In the representative embodiment of FIG. 2 where the service provider is an e-mail provider, numerous network elements are involved including communication devices having messaging clients (not shown) and service activation clients 200, 202. Each client type 200, 202 may represent a different service activation client for different devices. For example, a client type-A 200 may be used for a first mobile phone, where a client type-n 202 may be used for a particular personal digital assistant. In another representative example, the client type-A 200 may be used in one particular mobile phone model and the client type-n 202 in another mobile phone model. These client modules 200, 202 may be implemented as embedded native applications in the devices or as add-on applications.

The devices associated with the client modules 200, 202 have a user interface (UI) such as a browser application and display to provide a web UI 204A, 204B to network elements such as the service activation server 206 and e-mail provider's account creation interface for users 208. A signing server 210 can be used for signing the configuration document, as described in greater detail below. One embodiment involves a settings database 212, where the service activation server 206 imports data from the settings database 212. In one embodiment, the settings database 212 is editable via an interface, which in one embodiment is implemented as a web interface 214. The settings database 212 may be used for storing the settings data, and can store the parameters in a flexible schema that can be extended for other service provisioning needs (e.g., IM, VoIP, etc.). The service activation server 206 and/or signing server 210 may be controlled via an administrator UI 216. A monitoring module 218 may also be used to monitor system functionality.

As indicated above, administration of the service provider settings may be accomplished via the administrator UI 216 by an administrator. The administrator may enter new service provider information manually, such as by entering the settings parameters manually by way of the administrator UI 216. Alternatively, the settings parameters/information may be received by way of a document(s) or other data block that is provided to the administrator UI 216. In still another representative embodiment data from an external master database(s) (not shown) can be automatically updated, such as automatic periodic, scheduled or event-triggered updates to the settings database 212. A higher administrator, such as "super administrator," can create accounts for persons in particular regions or countries to have administrative rights for administering the new account offering in a given region, country, group of countries, etc.

Management of the service activation server 206 and/or other elements associated with the service activation server 206 may also include testing of new information associated with the server 206. For example, the service activation server 206 may include testing functionality where data, such as new service provider information, can be tested during which time it can be hidden from other devices 200-202.

One representative manner for conducting such testing is for the administrator or other designated user to enter a particular keyword(s) or other test identifier through a handset when the server 206 requests, for example, a username or other identifier for the service account. More particularly, when testing a new e-mail provider entry on the server, the e-mail provider entry may be active on the server only for testing, and not presented to other users. The tester may first choose to use an existing account when the wizard is initiated. When the server 206 requests an e-mail account (e.g., to enter an e-mail address and/or other e-mail account information), the tester can key in or otherwise enter the keyword. This keyword notifies the server 206 that a test is being conducted, and the server 206 enables configuration with a service provider entry on the server which is active only for testing. The tester now keys in the e-mail address for the new service provider entry, and tests if the e-mail properly operates with the device configured with the settings from the server for the new service provider. In this manner, the administrator or other designated tester can determine if the service provider entry is functionally operative before making the new service provider entry available to all users.

The representative elements of FIG. 2 collectively allow various things to occur. For example, a user can create a new e-mail account and have it configured for the device. Alternatively, a user can configure the e-mail client on the handset to use an existing e-mail account. Authorized maintenance personnel are allowed to create, update and modify operator details, such as an outgoing SMTP server address. The maintenance personnel may also be allowed to create, update and modify e-mail provider details, such as an incoming IMAP or POP server address. The maintenance personnel may also be allowed to import data from the settings database 212, import and export data, create reports on system usage, monitor system functionality, etc.

An exemplary use case for the representative system of FIG. 2 is now described. When a user opens an unconfigured e-mail client/application (not shown), one embodiment involves presenting the user with the option of activating the application. For example, this may be presented upon the first attempt to invoke the messaging client (e.g., e-mail application). Alternatively, there may be a "create email account" menu item in the messaging client. As another example, a separate UI may reside in the device for accessing settings configuration including an option to "create new email account," "activate email client," and/or "configure email." As yet another example, a link on a web page can point to the service activation server to initiate a service activation. The aforementioned examples are merely representative examples, and numerous other alternatives are also available to initiate the creation of a new account.

In the case where the user has opted to create a new account, the user is presented (visually and/or otherwise) with a list of e-mail providers, such as where the handset browser retrieves such a list from a service activation server 206 and/or settings database 212. In one embodiment, the particular list presented is dependent on one or more parameters associated with the handset or user, such as the country of the device, the operator of the device, the device model, the language of the device, etc. In one embodiment, a person(s) in the particular country manages the list through an administrator user interface (UI) 216 of the service activation server; e.g., a service activation account for that country/operator/language/device combination was allocated to that user by an administrator. A company may make country-specific agreements with service providers who have in certain devices a distribution channel to their accounts. The user clicks one of the service provider options which takes the user to the account creation web pages of the provider 208. In one embodiment, the user gets a web page confirmation from the service provider 208 that the account was created, whereby the user may obtain an e-mail address, username, and/or other information that is presented to the user.

In accordance with one embodiment of the invention, a link or other selectable item is provided to the user to initiate configuration to the new account. This may be performed automatically upon selection of a service provider. In another embodiment, a confirmation web page (or similar electronic document) from the service provider provides a link, such as a "CONTINUE" link. In one embodiment, clicking such a link causes the device to be automatically configured to the new account, and at the end of this configuration process the user may be presented with the main menu of the messaging client with the new email box appearing in the menu. Such a "continue" or other similar link can include all parameters needed to properly configure the account to the device. The link points to the service activation server, which in one embodiment is the same server which the handset accessed in the beginning of the service activation session in order to retrieve the e-mail provider list based on the parameter(s) received by the server from the device. In one embodiment, the service activation server 206 may have already received from the device some parameters to ensure security when the device originally requested the service provider list.

Using parameters from the device and also possibly from the email provider 208, the service activation server creates a configuration file. In one embodiment, the service activation server 208 requests a signing server 210 to sign the document. The signed document is received by the device, the signature is checked, and configuration is completed.

In one embodiment, implementation can be effected using an e-mail activation wizard/client(s) 200, 202 provided in the device, e-mail servers (e.g., IMAP, POP, SMTP) and web servers (e.g., providing account creation web pages) of any consumer e-mail providers together with easy account creation and service activation. This makes e-mail messaging simple for the user. After service activation, the device e-mail client has the configuration parameters in place to receive and send emails. The user does not need to know anything about the configuration, and rather needs only provide some easy to understand data such as names, passwords, etc. For the service provider, the method is simple and straightforward to deploy, as the only thing needed is a few web pages to enable service activation and reach potentially a high number of new customers.

Figure 3A:
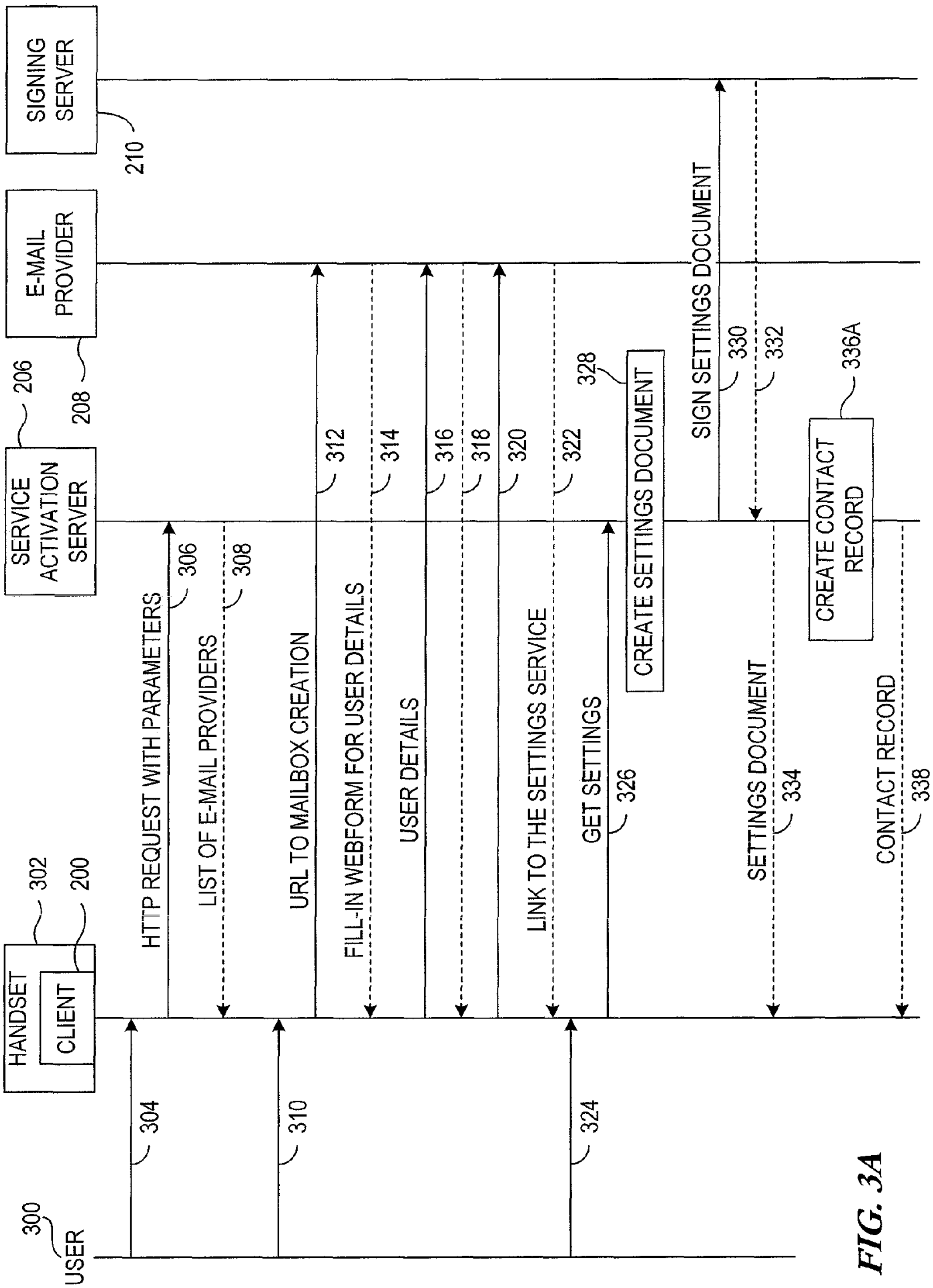
FIG. 3A is an exemplary message flow diagram of one manner in which a service account can be created and activated.

FIG. 3A is an exemplary message flow diagram of one manner in which an e-mail (or other service) account can be created and activated. As some network elements of FIG. 3A correspond to those of FIG. 2, like reference numbers have been used for the service activation client 200, service activation server 206, e-mail provider 208 and signing server 210 in FIG. 3A.

The example of FIG. 3A assumes that the user 300 has attempted to launch an unconfigured e-mail client associated with the user's handset 302. By using the mobile device 302, the user is able to create a new account and get the device 302 configured to use the new account. In the exemplary embodiment of FIG. 3A, the service activation server 206 and the e-mail provider 208 both serve HTML pages to the user 300. As will be demonstrated below, the embodiment of FIG. 3A involves the user first interacting with the service activation server 206, and then with the e-mail provider 208, and then again with the service activation server 206.

The user 300 first chooses to create a new e-mail account via the handset 302, as depicted by interaction line 304. In one embodiment, the user activates the e-mail service activation wizard (i.e. client 200) on the handset and starts the account creation process. This may be activated in any UI manner, including but not limited to selecting a link, selecting a menu item, entering text, etc. A web browser on the handset is launched, where the initial URL points to the e-mail service activation server 206.

In one embodiment, the handset 302 sends an HyperText Transfer Protocol (HTTP) or other analogous request 306 with various parameters such as, for example, the user's location and network (e.g., MCC, MNC), handset type, language, key information, nonce, etc. These parameters are used in the messages between the system components, or in other words, these parameters form a part of the namespace for the interactions. Among other things, some of these handset parameters (e.g., MCC, MNC, handset type, language) enable a set of e-mail providers to be limited to a relevant subset of e-mail providers. Other parameters (e.g., "keyinfo," "nonce") enable trust to be built between the client and the server. In one embodiment, the client 200 and/or other service activation client adds the parameters to the URL. Table 1 below illustrates a representative parameter set that may be passed from the handset 302 to the service activation server 206 with the new service request.

TABLE 1

| PARAMETER | DESCRIPTION |
|---|---|
| MNC | Mobile Network Code of the user. This parameter may be used to customize service based on locale information of the user.<br>Example BNF (Backus-Naur Form) syntax: Numeric string.<br>MNC = 1*3DIGIT |
| MCC | Mobile Country Code of the user. This parameter may be used to customize service based on locale information of the user.<br>Example BNF syntax:<br>MCC = 1*3DIGIT |
| Nonce | Created at the handset. The device may provide a NONCE code (randomly created) to the e-mail service activation server 206. The nonce is used as part of the signature calculation (using, for example, a well defined asymmetric signing process) when the provisioning document is sent to the device. The device can then automatically accept the provisioning without bothering the user.<br>Example BNF syntax:<br>Nonce = 8nonce-char<br>nonce-char = ([a-z]\|[A-Z]\|[0-9]) |
| keyinfo | The public key may be built in the client software in the handset, and serves as the keypair identifier that may be used for signing and verification. In one embodiment, the service activation server 206 can interoperate with multiple generations of devices, where each of the device generations may have a unique public key with an associated private key managed by the server.<br>The device indicates which private key is to be used. This may be accomplished using a Key parameter "keyinfo" that provides a reference string of, for example, a maximum of 16 characters.<br>In an exemplary embodiment, the value of the key parameter has a prefix of "skey" appended with the creation date of the keypair in format YYYYMMDD.<br>Example BNF syntax:<br>keyinfo = "skey" creation-date<br>creation-date = 8DIGIT |
| deviceinfo | The deviceinfo parameter identifies the phone model that is making the provisioning request.<br>Example BNF syntax:<br>deviceinfo = 2*10ALPHA |
| action | The action should be set to "create" if the user's goal is to create a new e-mail account, or "activate" if the user's goal is to activate an existing account. Set to "create" in the example of FIG. 3A.<br>Example BNF syntax:<br>action = ("create" \| "activate") |
| cVersion | This is the version number of the client software.<br>In one embodiment, the cVersion parameter is used to express the Plug and Play (PnP) Mobile Services capabilities of a device.<br>Example BNF syntax:<br>cVersion = <PnP-MS Capability><br><PnP-MS Capability> = <PnP-MS Capability Name>-<major>.<minor><br><PnP-MS Capability Name> = 1*ALPHA<br><Major> = 1*ALPHA<br><Minor> = 1*ALPHA<br>Example:<br>cVersion=EXAMPLE-1.2<br>It should be noted that the exemplary version number shown above represents an expression of the PnP capabilities of a device. In some cases, such as VoIP, version information of the VoIP client itself may also be provided. |
| sType | This represents the type of the setting to be created. In one embodiment, for email settings this parameter is set to a particular value, such as 1.<br>BNF syntax:<br>sType = "1" |

As an example, the URL (or other uniform resource identifier URI) that is invoked might look like the following:

```
https://<servername>/settings/getProviderList.do?MNC=123&MCC=
123&Nonce=abcdefgh&keyinfo=nok12345&deviceinfo=N90-1&action=
create&sType=1
```

The user's language may be determined by the accept-language HTTP header. In response to receiving the parameters, the service activation server 206 identified by the URL (or other URI) obtains a list of the e-mail providers that are available to the user based on the parameters. This list is returned 308 to the handset 302 where it can be displayed or otherwise presented to the user 300.

The set of service providers from which the subset/list of service providers is obtained may be maintained by one or more entities. In one embodiment the service provider is added to the set or pool of potential service providers through an administrative UI if the associated company so chooses. For example, a company serving as a service provider may complete testing, verification, etc. of the service, and thereafter notify an administrator of the pool to add the service provider to the pool of service providers. In another embodiment, a web UI can be provided for the service providers to add themselves to this pool of service providers. In this case, more responsibility is given to the service provider to ensure proper operation. Additionally, the order of the service providers on the set and/or resulting subset/list of service providers can be managed by the administrator. Alternatively, the order can be random, alphabetical, rotating view, etc.

From the presented list of e-mail providers, the user can then select the desired e-mail provider as depicted at interaction line 310. In one embodiment, the list of e-mail providers that is presented by the handset's 302 browser includes links to each e-mail provider's account creation page(s). In such an embodiment, the user selects one of the links corresponding to the desired e-mail provider 208. The URL associated with the selected link is sent 312 to the e-mail provider 208 identified by the URL, and also includes e-mail account parameters. Table 2 below illustrates a representative e-mail account parameter set that may be passed from the handset 302 to the e-mail provider 208, such as being appended to the selected e-mail provider URL. The request may be made in any known manner, such as by way of a GET or POST request which includes parameters such as those in Table 2 below. The e-mail provider 208 should store the parameters for the duration of the sign-up process.

TABLE 2

| PARAMETER | DESCRIPTION |
|---|---|
| MNC | Mobile Network Code of the user. |
| MCC | Mobile Country Code of the user. |
| homeUrl | It may be desirable to allow the user to navigate back to the provider list page in the service activation server 206. The homeUrl defines the address of the service activation server 206, where the user could be directed if he/she decides to cancel the e-mail activation process while interacting with the e-mail provider's server. Thus, this address may be given to the e-mail provider 208 with the "homeUrl" parameter or other appropriate parameter. |
| serverUrl | This parameter defines the address of the service activation server 206. |

In response, the e-mail provider 208 may provide 314 a fill-in webform to obtain user details. For convenience, this webform(s) should be formatted for the user's handset 302. The user can provide 316 details to create the e-mail account with the e-mail provider 208. In one embodiment, the e-mail provider 208 takes appropriate measures to prevent automated e-mail account creation, such as making the user recognize text in an image. The e-mail provider 208 may also require payment from the user. These or other/additional interactions 318, 320 may be effected.

In one embodiment, the e-mail provider 208 eventually creates the new account, and provides 322 a link or other selectable item to the settings/configuration service. In one embodiment, what is provided is a link on a page provided to the handset's 302 browser. For purposes of discussion, it is assumed that this link is titled "Activate," which points to the service activation server 206. The user clicks on the "Activate" link as depicted by interaction line 324, which in turn causes a request 326 to be sent from the handset 302 to the service activation server 206. This URL "request" includes the address of the service activation server 206, and various parameters. The parameters may include, for example, the parameters earlier provided by the device (e.g., MCC, MNC, keyinfo, Nonce, etc.). The parameters may also include e-mail account details, such as the e-mail address, username, IMAP server address and type, SMTP server address, etc. Some of these parameters may be provided by the e-mail provider 208 back end, such as the e-mail address and username. Other of these parameters may be provided by the handset 302 at the start of the service activation session. In any event, sufficient parameters are provided to the service activation server 206 to allow the service activation server 206 to create 328 the settings document, also referred to as the configuration document or provisioning document. Table 3 below illustrates one representative, exemplary parameter set that can be provided from the e-mail provider 208 to the service activation server 206.

TABLE 3

| PARAMETER | CONSTRAINT | DEFAULT | DESCRIPTION |
|---|---|---|---|
| sType | mandatory* | 1 | Represents the type of the setting to be created. In one embodiment, for email settings this parameter is set to a particular value, such as 1. Example BNF syntax: sType = "1" |
| provId | mandatory* | — | A unique ID of the e-mail provider 208. Service activation server 206 is able to recognize provider based on this parameter. Each provider knows its own id. Example BNF syntax: provId = 2*20ALPHA |

TABLE 3-continued

| PARAMETER | CONSTRAINT | DEFAULT | DESCRIPTION |
|---|---|---|---|
| settingName | database | Configured default value | User readable name of the setting to be created. This parameter appears as a name of the setting in handset. BNF syntax: settingName = 1*30ALPHA |
| fromAddr | asked | — | User's e-mail address. Example BNF syntax: fromAddr = 1*ALPHA |
| inAddr | database + asked | — | Address of the incoming mail server. Example BNF syntax: inAddr = 1*ALPHA |
| inPort | database | 110 for POP3, 143 for IMAP and 993 for IMAPS | Port number of the incoming server. Example BNF syntax: Any valid port number. inPort = 1*5DIGIT |
| inAuthName | asked | User's email address without domain | User name used when authenticating with incoming mail server. If this and inAuthPass are omitted, no authentication is performed when connecting to incoming mail server. Example BNF syntax: inAuthName = *ALPHA |
| inAuthPass | asked | Equals to outAuthPass, if it is set. | Password used to authenticate with incoming mail server. Example BNF syntax: inAuthPass = *ALPHA |
| inAuthType | database | LOGIN | Authentication type used to authenticate with incoming mail server. Example BNF syntax for POP3 servers: inAuthType = ("CRAM-MD5" \| "DIGEST-MD5" \| "LOGIN" \| "PLAIN") Example BNF syntax for IMAP servers: inAuthType = "LOGIN" |
| inType | optional | i | Type of the outgoing server. 'i' from IMAP and 'p' for POP3. Example BNF syntax: inType = ("i" \| "p") |
| outAddr | database + asked | — | Address of the outgoing mail server. Example BNF syntax: outAddr = 1*ALPHA |
| outPort | optional | 25 | Port number of the incoming server. Example BNF syntax: Any valid port number. inPort = 1*5DIGIT |
| outAuthName | asked | User's email address without domain | User name used to authenticate with outgoing server. Example BNF syntax: outAuthNam = *ALPHA |
| outAuthPass | asked | — | Password used to authenticate with outgoing mail server. Example BNF syntax: outAuthPass = *ALPHA |
| outAuthType | database | LOGIN | Authentication type used to authenticate with outgoing server. Example BNF syntax: outAuthType = ("CRAM-MD5" \| "LOGIN" \| "PLAIN") |

*"mandatory" only for purposes of this example embodiment.

In one embodiment, after creating 328 the settings document the service activation server 206 signs 330 it. In one embodiment, it is signed using a private key in the signing server 210, and the e-mail service activation server 206 receives 332 the signed document and the client verifies the signature using a public key. Thus, the service activation server 206 may sign the configuration document with a private key, and the client may check the signature with the respective public key. This addresses security concerns for the device user, such that the user does not need to be bothered with a potential security risk of a possibly malicious configuration package arriving at the device. For example, if a configuration package is today sent via SMS, the user must decide whether he/she wants to save the configuration data. The embodiment of the present invention involving signing the configuration document alleviates this type of problem for the end user.

Upon completion of the optional signature verification, the settings are installed on the handset 302 by providing 334 the settings document to the handset 302. When this process is complete, the e-mail mailbox can be immediately accessed on the handset 302 by launching the e-mail client software. In another embodiment, the service activation client 200 can launch the e-mail client with the newly configured settings.

While the configuration or "settings" document can be provided in any desired form and can provide any desired information to adequately configure the handset 302 for use with the service, a representative example of a settings document is provided below. This particular example is provided merely to illustrate exemplary settings parameters and programming example. For example, in one embodiment, before the over-the-air provisioning of a mobile device, the settings document is converted into a binary WBXML (WAP binary XML) form and a special headwrapper may be applied. The following example (Example 1) represents example code to configure settings according to a particular development platform:

```
<characteristic type="APPLICATION">
  <parm name="APPID" value="143"/>
  <parm name="PROVIDER-ID" value="MyMail"/>
  <parm name="NAME" value="IMAP box"/>
  <parm name="TO-NAPID" value="Browsing_GPRS"/>
  <characteristic type="APPADDR">
    <parm name="ADDR" value="imap.mail.com"/>
    <characteristic type="PORT">
      <parm name="PORTNBR" value="143"/>
      <parm name="SERVICE" value="STARTTLS"/>
  </characteristic>
  <characteristic type="APPAUTH">
    <parm name="AAUTHNAME" value="username"/>
    <parm name="AAUTHSECRET" value="password"/>
  </characteristic>
</characteristic>
```

EXAMPLE 1

In one embodiment, if the e-mail provider does not have an IMAP or POP interface towards users but rather only has a web interface, a bookmark to the e-mail provider's mail box authentication page can be configured in the browser rather than configuring the IMAP or POP interfaces to the email client.

In addition to delivering the signed settings document 334 or other configuration file to the device, the service activation server 206 can be used to administer downloading of software (e.g., Java midlet) to the device. Assuming for purposes of example that the software is a Java midlet, the midlet may be downloaded from another server (not shown) which is triggered by the service activation server 206. This provides additional convenience to the end user, as relevant software may be obtained in connection with the configuration (and possibly creation) of the service account.

A representative working example involves invoking a client, such as a wizard, on the device. The client/wizard can be invoked in any desired manner. One manner is to select the wizard from a menu, or use graphical and/or textual designation of the wizard. Another representative manner is to have the wizard triggered automatically upon initiation or use of another application on the device (e.g., camera application, VoIP application, etc.). In the case of the wizard being triggered by some event, the user may be provided with an option to activate the relevant functionality. The user may engage the wizard, and set up and/or create a service account in the manner described herein. Now referencing FIGS. 2 and 3A, the data associated with the server 206 may include settings data and information regarding software needed to enable a working service through the device and to be downloaded to the device. When an account has been established and/or configured, the settings document or other configuration file is created from parameters the server 206 received form the service provider 208 and parameters residing on the database 212 associated with the server 206. As previously indicated, this configuration file or "settings document" is signed and sent 334 to the device 302, whereby the device checks the signature of the configuration file and configures the device. In one embodiment, a download of the relevant software from another server (not shown) is triggered. When the configuration file and the software are properly stored and processed on the device 302, the user may use the service. The relevant software may be administered to the download server (not shown) through its administrator UI, and the address to the download server may be administered by the service activation server 206 via its administrator UI 216.

As described above, at some point the provider 208 creates the e-mail account in response to the user details 316. In one embodiment, whether or not the user ultimately continues on to activate the account, the user can be provided with the ability to store the e-mail information, such as his or her new e-mail address that resulted from the creation of the new e-mail account. Information can also be provided in this manner where an existing e-mail account is configured on the device, as is further described in connection with FIGS. 5 and 6. In either case, the user's e-mail address and/or other information associated with the creation and/or configuring of the handset 302 or other device can be stored. The information can be stored locally on the handset 302 or other device, and/or can be stored remotely such as with the e-mail provider 208.

In one specific example, when a new e-mail account has been created and/or configured, certain information resulting from the creation/configuration may be important for the user to know. In the context of e-mail services, creation of an e-mail account for a user results in a new e-mail address for that user, which the user would not previously know. This information may be stored, such as locally on the user's device, on the service provider's server, etc.

Thus, one aspect of the invention enables a user to store newly-created service information locally on his or her handset or other device. One embodiment involves storing this information in a client database where contact information is otherwise stored, such as in a record of the local contacts database (e.g., contact card, vCard, etc.). The user then has a convenient way to find his or her own e-mail address or other service number/address, in addition to having a convenient way to provide his or her e-mail address to relatives, friends, business colleagues, acquaintances, etc.

This is equally applicable to services other than e-mail services. For example, the user may create a new VoIP account in a manner previously described. The VoIP address can similarly be stored to the Contacts or other relevant database. The user can then forward the Contacts item to others, who then have the information required to contact the user via his/her VoIP number or other address. Thus, information from any service creation and/or configuration may be locally and/or remotely stored for the convenience of both the user and others who may want to contact that user.

FIG. 3A illustrates one manner in which such a contact record(s) is made available to the user 300. In this illustrated example, the service activation server 206 creates a contact record 336A. This contact record may be in a form known to be compatible with a contact client (not shown) at the handset 302 or other device. For example, when the user details 316 are provided, this information can include an identification of the type of e-mail client(s) operable on the handset 302. Using this information, the service activation server 206 can provide 338 a client-specific contact record usable via that e-mail client. In other embodiments the service activation server 206 can provide 338 a contact record that is compatible with multiple or all e-mail (or other service) clients. One example is a vCard, which is widely supported by e-mail clients. The contact record can then be automatically stored in the device 302, or alternatively a query may be presented to the user 300 via the device 302 to allow the user to choose to store the contact record. The contact record may include, among other things, any user-service identifier that relates the user and the service, such as an e-mail address, VoIP number/address, SIP address, instant messaging address, web URL, etc.

One representative alternative to providing an entirely new database record (e.g., vCard) is that the contact record provided to the device 302 updates an existing contact record in the device's 302 contact database. For example, the contact record provided 338 by the service activation server 206 may include information, such as an new e-mail address, to replace or augment an existing contact record for that user. The provided information may be created in a new field(s) of the user's existing contact record, or may overwrite or otherwise replace an existing field(s) of the user's existing contact record. In one embodiment, the client 200 or a contacts client at the device 302 can determine whether to add the received contact record as a new contact record in the contacts database, or whether to change an existing contact record(s).

Figure 3B:
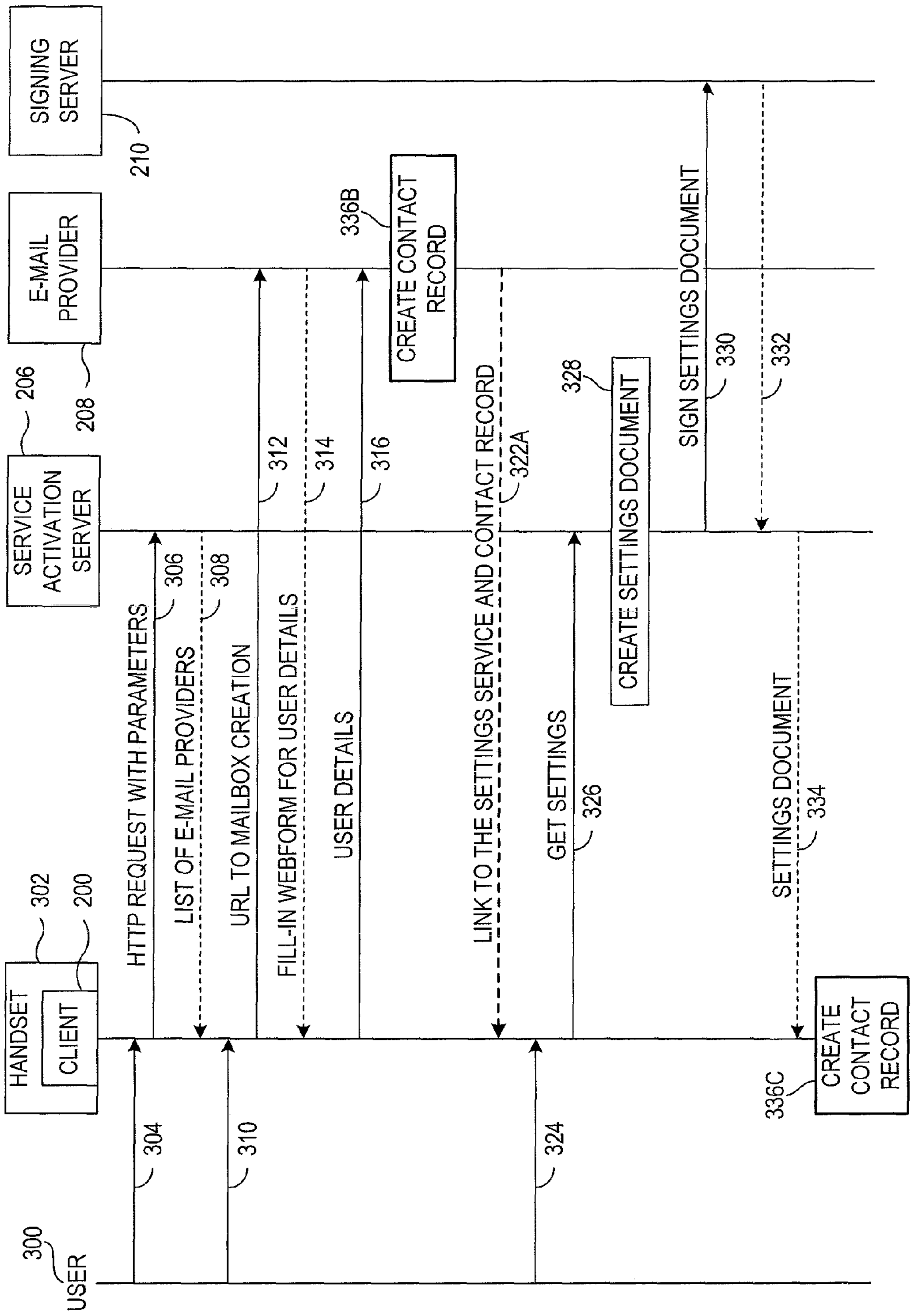
FIG. 3B is an exemplary message flow diagram illustrating alternative representative embodiments in which a resulting contact record may be made available to the user.

FIG. 3B is an exemplary message flow diagram corresponding to that of FIG. 3A in which a service account is created, which depicts alternative, representative embodiments in which the contact record may be created and/or provided to the user. For ease of reference, reference numbers used in FIG. 3A are retained in FIG. 3B.

In the example of FIG. 3B, the contact record may be created 336B at the e-mail provider 208, or elsewhere. The e-mail provider 208 is privy to the user details 316 and the user's new e-mail or other service address, and accordingly can create the contact record (or update an existing contact record(s) already in the user's contact database). The contact record can be provided separately to the handset 302, or can be provided with other information such as the link to the settings service as depicted on line 322A.

In another representative embodiment the handset 302 itself can create the contact record 336C. Upon receiving the e-mail address, a local client 200 (or other client) can create a new contact record 336C and enter the new e-mail address. The client 200 may alternatively, or additionally, modify any existing contact record(s) that might already be present in the local contact database. This equally applies to other services, such as VoIP accounts, photo sharing accounts, etc.

FIG. 4, including FIGS. 4A-4I, illustrates an exemplary, representative progression of device screen/display presentations during the creation and configuration of an e-mail account. As noted previously, the following description can also generally be applied to the creation/configuration of other accounts. The displays or screens shown in FIG. 4 refer to a display/screen on a mobile device (e.g., mobile phone, PDA, etc.), but the invention is equally applicable to other screen sizes and configurations.

Figure 4A:
FIGS. 4A-4I, illustrates an exemplary, representative progression of device screen/display presentations during the creation and automatic configuration of an e-mail account.

FIG. 4A illustrates screen 400A, which presents a menu of selectable items. In the illustrated embodiment, one such selectable item is the e-mail item 402 provided via a representative messaging menu. Clicking on or otherwise using UI functions to select the e-mail item 402 typically invokes an e-mail client/application on the mobile device. If no e-mail account has been created, the e-mail application will be unable to communicate e-mail messages. Thus, if the e-mail client cannot locate the proper settings, the user can initiate creation and/or configuration of an e-mail account. In one embodiment of the invention, a service activation client to establish an e-mail account is automatically invoked when the user attempts to invoke the e-mail client from the e-mail item 402. In other embodiments, the client may utilize other UI functions (e.g., text entry, menus, voice activation, etc.) to initiate the e-mail account creation process.

Service activation sessions can be initiated in other manners than selection of a menu item 402. For example, a service activation session can be initiated in the device UI outside the e-mail client, or via a link on a web page, or otherwise. If, however, the service activation session is initiated via a web link pointing to the service activation server, the server may not get the required parameters (e.g., keyinfo, nonce, MCC, MNC) within the request from the device. In such case the server can first make a request to the device to obtain the required parameters (e.g. PAOS; reverse SOAP request). The mechanism in the service activation client to create the parameters is, for example, triggered by the request from the server.

Figure 4B:
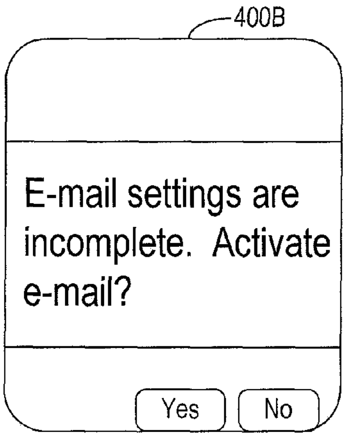
Figure 4C:
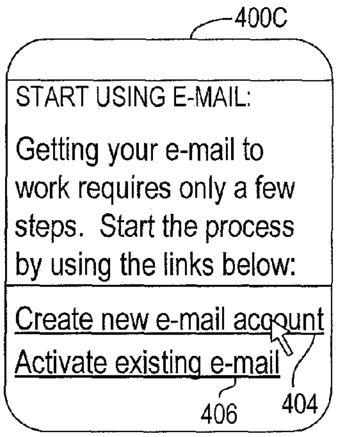
Figure 4D:
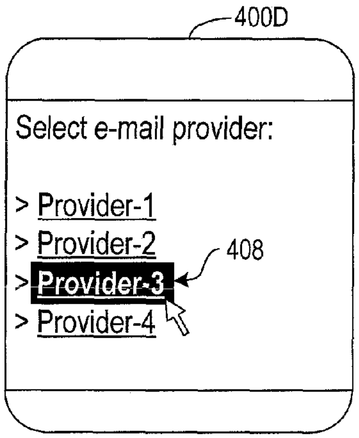
Figure 4E:
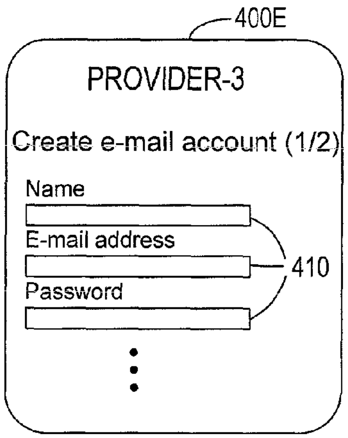
Figure 4F:
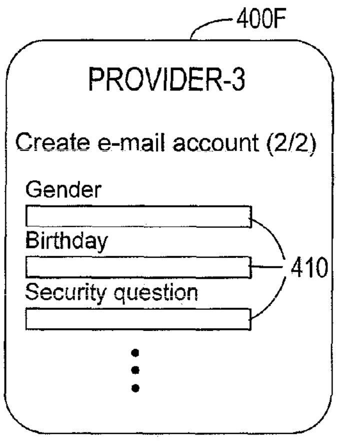

The user may be given the choice as to whether or not to activate the e-mail client on the device, such as is shown at FIG. 4B, where screen 400B presents the user with the question whether or not e-mail activation is desired. If the user selects "no," no e-mail activation will take place. If the user selects "yes," screen 400C of FIG. 4C is presented, such as via a browser program. This allows the user to create a new e-mail account, or activate the e-mail client with an existing e-mail account. The embodiment of FIG. 4C provides this selection by way of links 404, 406. In the embodiment of FIG. 4, it is assumed that no e-mail account has been established, and therefore it is assumed that the user selects link 404 to create a new e-mail account. As previously described, this results in a request being sent to a service activation server in accordance with the invention, whereby a list of available e-mail providers is provided back to the device where it can be presented as shown on screen 400D of FIG. 4D. In the illustrated embodiment, each of the possible list items is presented in the form of a selectable link. The user selects one of the e-mail providers (e.g., Provider-3 408), which directs the device browser to an account creation page(s) of the e-mail provider's site shown in FIGS. 4E and 4F. As shown on these displays 400E, 400F, the user may be asked to enter information 410 by way of, for example, a number of input fields on one or more web pages that the e-mail provider will use to create the e-mail account. In another embodiment, the user may be asked directly in the UI to create a new account. In this case 4C would not be shown.

Figure 4G:
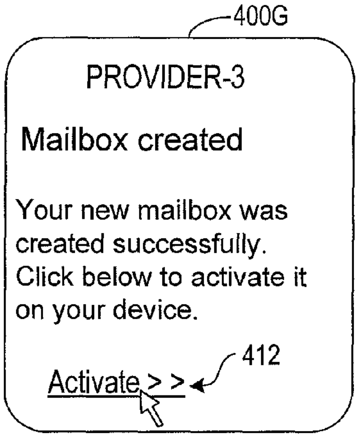
Figure 4H:
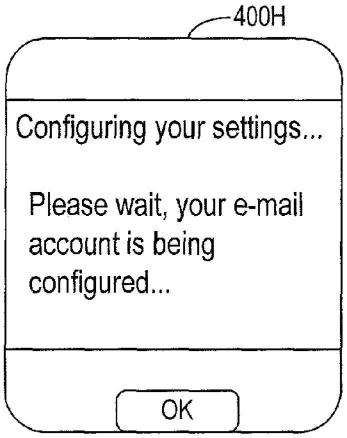
Figure 4I:
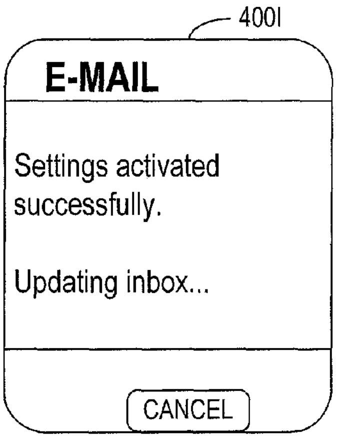

When the user has submitted this information, the e-mail account can be created whereby the user can be provided with an e-mail mailbox and/or other e-mail functionality accessible via the e-mail client. Screen 400G of FIG. 4G illustrates a screen indicating successful completion of the creation of an e-mail account. In one embodiment, the device may at this time be subjected to automatic configuration of the e-mail account, such as by receiving e-mail settings for the user's e-mail client. Other embodiments are also possible, such as that depicted in FIG. 4G where the user is provided with a selectable link 412. The e-mail provider may show on a page, such at that in FIG. 4G, some information specific to the new account. This information may include, for example, new email address, username, and the like, as well as advice or other guidance for the user, such as to carefully write down or otherwise record the username and e-mail address.

The user's selection of the link 412, or analogous activity as set forth above, will initiate activation (i.e. configuration) of the e-mail client at the user's device. The service activation server may present a screen 400H of FIG. 4H while the device is being configured with the appropriate settings. A screen (not shown) may be presented, such as via a browser, to notify the user of successful activation/configuration. Ultimately, the e-mail client can update the mailbox due to the new settings, as shown via screen 400I of FIG. 4I.

Figure 5:
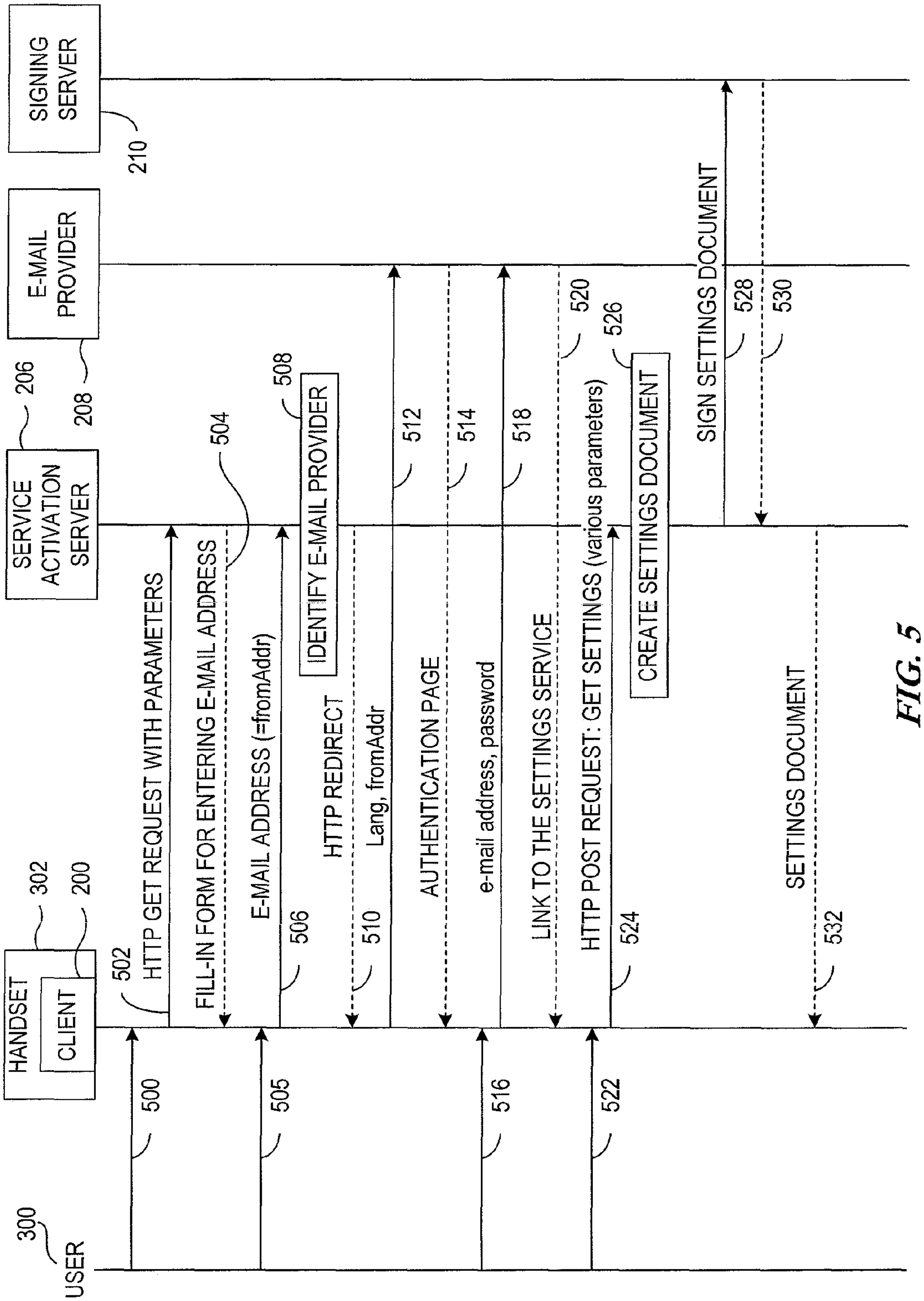
FIG. 5 is an exemplary message flow diagram of one manner in which a service account can be configured or otherwise activated for use on a device.

FIG. 5 is an exemplary message flow diagram of one manner in which an existing e-mail (or other service) account can be configured or otherwise activated for use on a device. As some network elements of FIG. 5 correspond to those of FIGS. 2 and 3, and for purposes of consistency and comparison, like reference numbers have been used for the user 300, handset 302, service activation client 200, service activation server 206, e-mail provider 208 and signing server 210 in FIG. 5.

The example of FIG. 5 assumes that the user 300 has attempted to launch an e-mail client (not shown) associated with the user's handset 302. One embodiment of the invention enables the handset 302 or other terminal to be configured for an existing e-mail (or other service) account. In the exemplary embodiment of FIG. 3A, the service activation server 206 and the e-mail provider 208 both serve HTML pages to the user 300. As will be demonstrated below, the embodiment of FIG. 5 involves the user first interacting with the service activation server 206, and then with the e-mail provider 208, and then again with the service activation server 206.

The user 300 first chooses to activate an existing account, as depicted by interaction line 500. The e-mail service activation client 200 or "wizard" on the handset 302 starts the activation process. A web browser or other access program on the handset 302 is launched. The initial URL points to the e-mail activation server 206, and includes various parameters. In one embodiment, an HTTP "GET" request 502 is issued by the client 200. Because the user already has an e-mail account and does not need to create a new e-mail account, the service activation server 206 does not respond with a list of e-mail providers as in the previous example. Rather, where an existing account is to be used on the handset 302, the service activation server 206 responds 504 with instructions and/or an appropriate user interface to enter the user's existing e-mail address that corresponds to the existing e-mail account. In one embodiment, a fill-in form is provided by the service activation server 206 to the browser application of the handset 302, thereby allowing the user to enter 505 and transmit 506 his/her e-mail address and/or other information. One embodiment involves providing a link or other UI function to enable the user to initiate the transfer of the information to the service activation server 206, where the link points to the service activation server 206.

The service activation server 206 receives the e-mail address, and recognizes 508 the e-mail provider based on the user's e-mail address. In response, the service activation server 206 can redirect 510 the user to the activation URI of the provider. For example, the service activation server 206 can issue an HTTP redirect command to the activation URL of the e-mail provider 208 associated with the user's existing e-mail address. Parameters such as the user's preferred language, e-mail address, and/or other information may be sent 512 to the e-mail provider 208. This process of redirecting the user to the e-mail provider's 208 site is transparent to the user. If the e-mail recognition fails, various responses may be effected, at least one of which is described more fully in the ensuing description.

Assuming the redirection to the e-mail provider's 208 site was successful, the user can optionally be authenticated on the e-mail provider's 208 website. In such an embodiment, an authentication page(s) is provided from the e-mail provider 208 to the handset's 302 browser, as depicted by the interaction line 514. The authentication page(s) can include, for example, a request for the user to enter 516 a user name, password, and/or other authentication information. This information is sent 518 back to the e-mail provider server 208. If the user 300 is authenticated, a link (or other relevant information to direct the user) to the settings or configuration service is provided 520. For example, a link or other UI feature for activating the e-mail on the handset 302 is presented to the user via the handset browser.

If the user selects this link/UI feature as depicted at interaction line 522, a request to activate the e-mail on the handset 302 is automatically made as depicted on interaction line 524. This link includes various parameters, such as those earlier provided by the device (e.g., with the request 502), as well as the e-mail account details (e-mail address, username, IMAP server address and type, SMTP server address, etc.). The link requests the service activation server 206 for configuring the device with these parameters. In one embodiment, the e-mail address and username come automatically from the e-mail provider 208 back end. This enables an easy experience for the user. Sending the password is optional, as it can be requested from the user when needed for the first time and saved to the device memory. In one embodiment, an HTTP POST request is used in response to the user clicking the link.

The handset's 302 browser is essentially forwarded back to the service activation server 206, which ultimately creates 526 the provisioning or "settings" document. In one embodiment, the service activation server 206 requests 528 a signing server 210 to sign the settings document using, for example, a private key in the signing server 210. The signed document is returned 530 to the service activation server 206, and ultimately provided 532 to the client 200 where the signature can be verified using, for example, a public key. The settings are then installed on the handset 302, and an e-mail mailbox or other e-mail features can be immediately accessed on the handset 302. These e-mail features are accessed by the user 300 launching the e-mail client software. In another embodiment, the e-mail client software is automatically launched by the client 200 when the activation process has completed.

FIG. 6, including FIGS. 6A-6G, illustrates an exemplary, representative progression of device screen/display presentations during the configuration of an existing e-mail account. The following description can also generally be applied to the configuration of other accounts. The displays or screens shown in FIG. 6 refer to a display/screen on a mobile device (e.g., mobile phone, PDA, etc.), but the invention is equally applicable to other screen sizes and configurations.

It should be noted that the invention is not limited to the particular screen sequence shown in FIG. 6, which merely sets forth a representative example. For example, the UI of the device may enable bypassing the web page described in FIG. 6C, and proceeding directly to a page described in FIG. 6D. Thus, the invention is clearly not limited to the specific embodiments shown, and the screens 600A-600G represent just one embodiment to facilitate an understanding of this aspect of the invention.

Figure 6A:
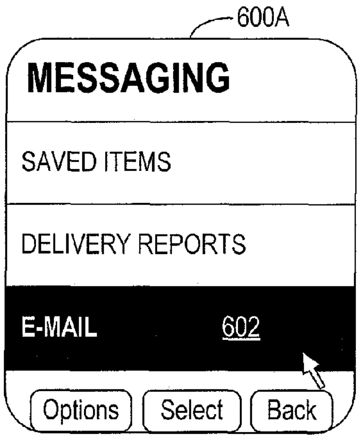
FIGS. 6A-6G, illustrates an exemplary, representative progression of device screen/display presentations during the automatic configuration of an existing e-mail account.
Figure 6B:
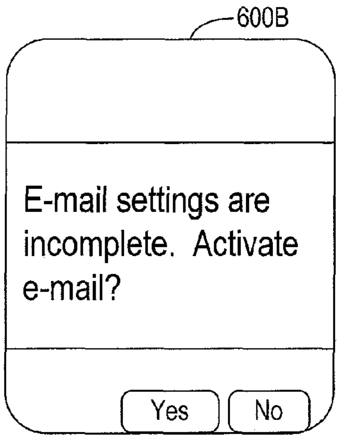
Figure 6C:
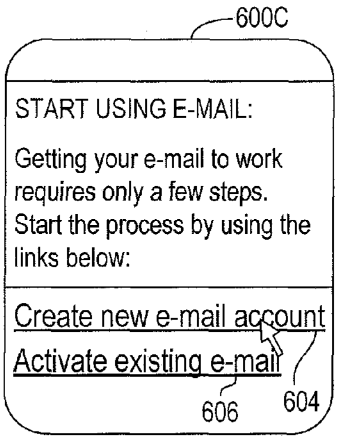

FIG. 6A illustrates screen 600A, which presents a menu of selectable items. In the illustrated embodiment, one such selectable item is the e-mail item 602 provided via a representative messaging menu. Clicking on or otherwise using UI functions to select the e-mail item 602 typically invokes an e-mail client/application on the mobile device. If the e-mail has not yet been configured, the user may be given the choice as to whether or not to activate the e-mail client on the device such as is shown at FIG. 6B, where screen 600B presents the user with the question whether or not e-mail activation is desired. If the user selects "no," no e-mail activation will take place. If the user selects "yes," screen 600C of FIG. 6C is presented, such as via a browser program. This allows the user to create a new e-mail account, or activate the e-mail client with an existing e-mail account. The embodiment of FIG. 6C provides this selection by way of links 604, 606. In the embodiment of FIG. 6, it is assumed that an e-mail account already exists, and therefore it is assumed that the user selects link 606 to activate an existing e-mail account.

Figure 6D:
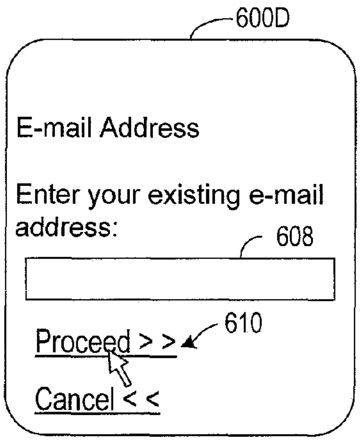

Selection of link 606 results in a request being sent to a service activation server in accordance with the invention, whereby the service activation server responds with some manner in which the user can enter his/her e-mail address. An example is shown in FIG. 6D, where screen 600D presents a manner for the user to identify his/her e-mail address for the e-mail account in question. In the illustrated embodiment, this is accomplished using a text entry field 608. When the user has entered the e-mail address, the user can select the "proceed" link 610 (or otherwise send the entered e-mail address) which points to the service activation server. As previously described, the service activation server recognizes the e-mail address, identifies the e-mail provider, and directs the handset's browser to the e-mail provider's site.

For privacy reasons the process can be designed to omit particular portions of the e-mail address, such as the "personal" portion prior to the "@" character. In this case only the part following the "@" character would be sent to the server for recognizing the service provider. This can be realized by, for example, implementing the web UI elements of the service activation server as embedded UI elements in the device. An appropriate part of the pages shown to the user come from the device. In this case, logic omitting a part of the email address can be designed. The service provider recognizes the user with, for example, the username which is input on a web page.

Figure 6E:
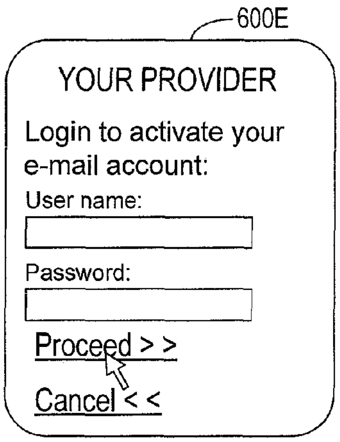
Figure 6F:
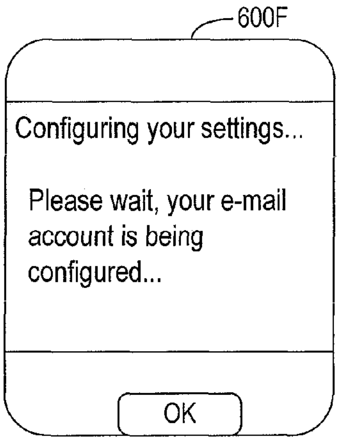
Figure 6G:
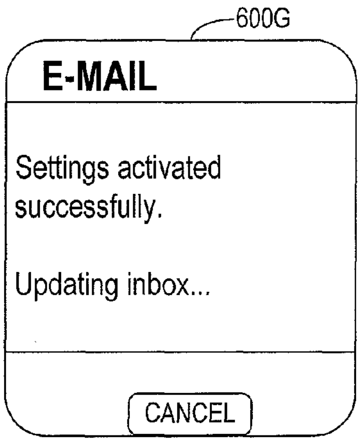

In one embodiment, authentication is required and the e-mail provider provides a page(s) 600E shown in FIG. 6E for the user to enter the appropriate authentication information, such as a user name, password, etc. In the illustrated embodiment, the device is at this time subjected to automatic configuration of the e-mail account, such as by receiving e-mail settings for the user's e-mail client. The service activation server may present a screen 600F of FIG. 6F while the device is being configured with the appropriate settings. A screen (not shown) may be presented (e.g., via the browser) to notify the user of successful activation/configuration. Ultimately, the e-mail client can update the mailbox due to the new settings, as shown via screen 600G of FIG. 6G. Alternatively, the messaging client menu or other user interface can be shown.

There are numerous variants that can occur in connection with the account creation and/or configuration processes. For activations of existing e-mail accounts, one such variant is where the e-mail provider cannot be recognized based on the user's e-mail address (see, e.g., provider recognition 508 of FIG. 5). If the service activation server 206 cannot identify the user's e-mail provider, one variant is to then provide the user with a UI whereby the user can select his/her e-mail provider, e.g., from a list, enter his/her e-mail provider, or otherwise notify the service activation server 206 of the user's e-mail provider.

Another variant associated with activating existing e-mail accounts is the detection is misspelled e-mail addresses. The provider recognition 508 may apply heuristics or otherwise determine the likely e-mail provider from an e-mail address received from the user that may be misspelled or otherwise entered incorrectly. For example, if an e-mail domain is "abcde.com," and the user enters his/her e-mail address as "abcd.com," the provider recognition module 508 can locate a likely match. In such case, the user may be presented with a confirmation question (e.g., "Is your e-mail provider abcde?").

Another variant associated with activating existing e-mail accounts is where the e-mail provider does not provide a page(s) for the user to activate an existing e-mail account (see, e.g., interactions 514 of FIG. 5). An e-mail provider does not need to do this, and when it does not, the user may interact only with the service activation server, using no username or password. More particularly, the service activation server detects the user's e-mail provider because the service activation server has the e-mail provider's configuration data in the local database. The service activation server can then create a settings (provisioning) document and send it to the user. Since the username and password (or other authentication data) are unknown at this point, they are not included in the settings document. In such case, the e-mail client can request entry of the username and password when the user first connects to his/her mailbox with the e-mail client. Alternatively, the user can add the data manually via settings UI for the email client.

Still another variant associated with activating existing e-mail accounts is where the user's e-mail provider is unknown to the service activation server. This is addressed in one embodiment by instructing the user to enter e-mail provider details manually using the e-mail client graphical user interface on the handset. Service activation server administrators can view reports of unknown e-mail providers, so that the missing data can be added to the database.

Another variant involves devices that include wireless local area network (WLAN) or analogous radios. Network operators may provide SMTP service in their networks for sending e-mails. The operator may recognize the sending device connected to their network, e.g. cellular or ADSL. Authentication is not required to prevent misuse of the SMTP facility when the device is recognized within the network. But if the device is connected via a network where the operator does not recognize the sender, e.g. WLAN, the sending of e-mail may not be possible via the operator SMTP service because the operator's network sees the request coming from outside the operator's network, e.g., cellular network, and is not able to recognize the device requesting sending the message. The service provider's SMTP address may be configured to the device. In this case an authentication with, for example, a username and password is required. If desired, the username and password may be the same ones as for the inbox access via IMAP or POP. In some operators' cellular networks an external SMTP service may not work. Therefore, handsets in the networks of these operators may be configured with the operators' SMTP address, whereby such devices will not work for sending e-mail over the WLAN. One embodiment of the invention involves providing multiple (e.g., two) configurations for the device, such as one configuration for GPRS and one for WLAN. The multiple SMTP configurations may, for example, be associated with the multiple access points (e.g. cellular GPRS APN, or WLAN) the email may use, e.g. one SMTP configuration for GPRS access point(s) and another one for WLAN APN. The e-mail application uses one of these, depending on which network traffic occurs. Alternatively, the operator SMTP may use a username/password to authenticate the user when outside the operator GPRS network.

Above some UI elements have been described to be based on web pages on the service activation server as an example. Alternatively, the UI elements described to be web pages on the Service Activation server can be implemented to be UI elements on the mobile device. For example, the service activation server may not contain any UI elements to be localized and maintained. In such case, the client and the server communicate otherwise with the described logic, but the mobile device takes care of all UI elements.

Among other things, the invention relieves the user from the otherwise tedious task of getting e-mail or other service settings correct when initiating a new e-mail service or configuring an existing e-mail service to a new device. For example, if an end-user does not have any e-mail account established that can be used on the new device (e.g., mobile phone), it is often confusing and complex for users to know what service providers are available, how to establish an account with a desired service provider, and how to configure the device to use the service. This is true for various service types, such as e-mail providers, voice-over-internet protocol (VoIP) applications, media and multimedia sharing applications, etc. The present invention solves these and other shortcomings of the prior art.

Figure 7:
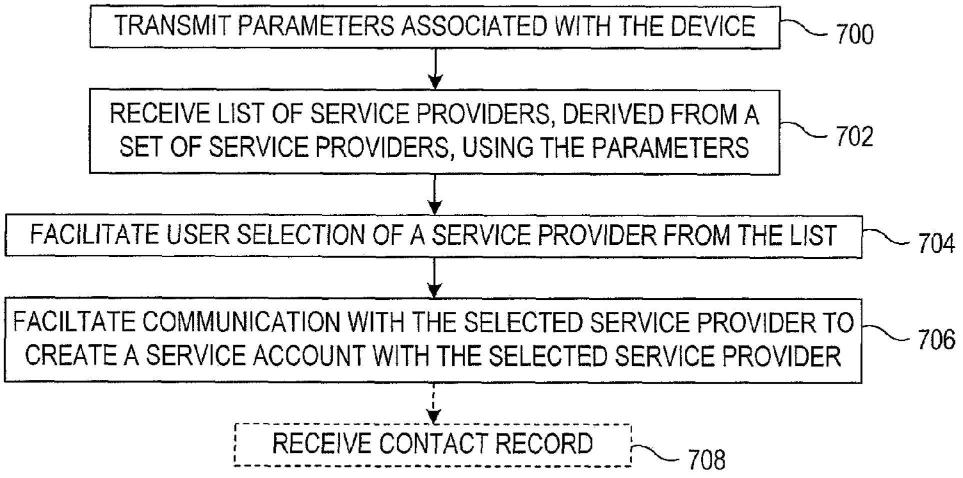
FIG. 7 is a flow diagram generally illustrating one exemplary manner by which a device can establish a service account for any service type.
Figure 8:
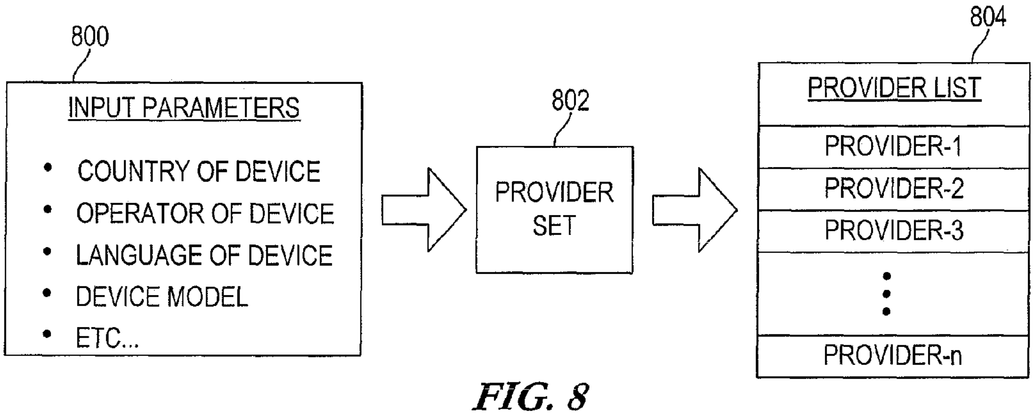
FIG. 8 illustrates an exemplary embodiment for deriving a filtered list of service providers based on parameters provided by the device.

The aforementioned embodiments generally refer to establishing and/or configuring an e-mail account on a device. As previously indicated, the present invention is equally applicable to other service types. FIG. 7 is a flow diagram generally illustrating one exemplary manner by which a device (e.g., mobile phone, PDA, etc.) can establish a service account for any service type. Parameters associated with the device are transmitted 700. FIG. 8, item 800 depicts some representative examples of such parameters which may include the home operating country of the device, network operator of the device, language of the device, device model, and/or other parameters. As previously described, these parameters may be transmitted 700 from the device to the service activation server via a command, message or otherwise. In one embodiment, the request is transmitted 700 via an HTTP request.

The device receives 702 a list of service providers, where this list is derived from a set of service providers using the parameters. Referring again to FIG. 8, the input parameters 800 are applied to a set 802 of service providers, such as by comparing the parameters 800 with attributes of each of the providers associated with the provider set 802. Providers that match or otherwise correspond to the parameters form the subset of providers available for the particular device. This subset of providers is shown as the provider list 804. It should be noted that the term "list" is not intended to suggest any particular form or order of the providers, but rather is used broadly to suggest identification of each of the providers that correspond to the input parameters 800.

The device facilitates user selection of a service provider from the list, as shown at block 704. This user selection may be available in any one or more forms, such as a graphical user interface (GUI), text entry, voice command, etc. Communication with the selected service provider is then facilitated 706 in order to create a service account with the selected service provider. For example, the service activation server can provide a link or otherwise notify the device of the network address of the selected service provider, thereby enabling the device to automatically be directed to the selected service provider's account creation website.

FIG. 7 also illustrates the possibility of the device receiving 708 a contact record. As previously described, one embodiment involves creating a contact record (e.g., vCard or analogous) using at least information derived by the service creation process. For example, the contact record may include the user's name and e-mail address in the case where the service provider is an e-mail service provider that created a new e-mail account. Various embodiments involve automatically storing the contact record at the device, and providing the user with an option to store a contact record (and/or update one or more existing contact records) via the device user interface. Other information may be included with the contact record as well, which may be based on the parameters associated with the device and/or other information transmitted to the service provider. For example, if the user included residence or business address information in connection with the creation of the account, that information may also be included in the contact record. Further, the contact record may be obtained from the service activation server or the service provider, or alternatively may be created by a client residing on the user's device in response to receiving the new service information.

Figure 9:
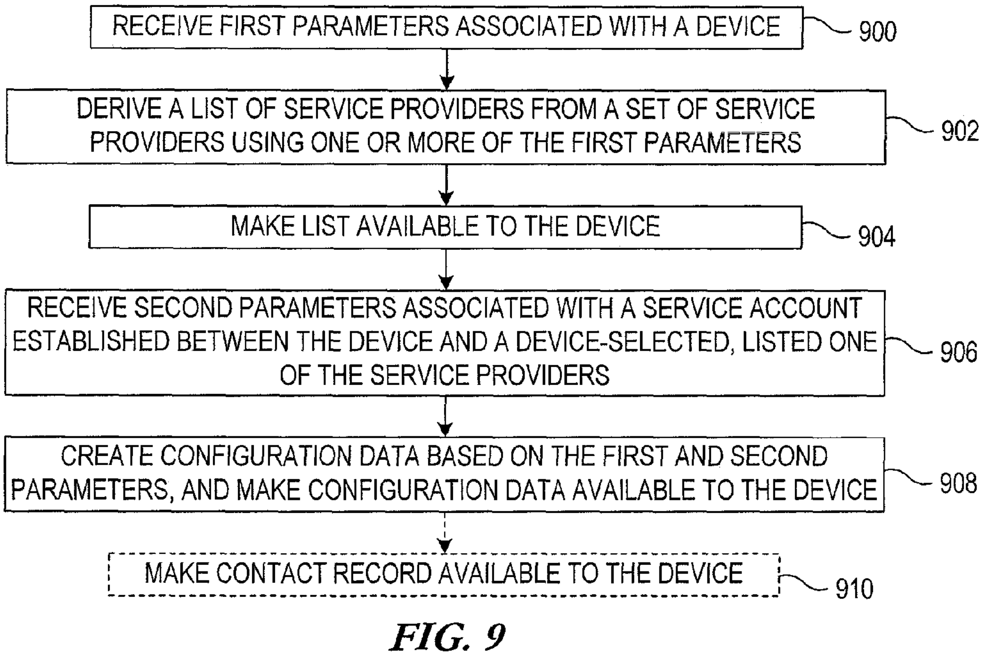
FIG. 9 is a flow diagram generally illustrating one exemplary manner by which a network element can direct the creation of a service account, and optionally configure the device for use with the service account.

FIG. 9 is a flow diagram generally illustrating one exemplary manner by which a server (e.g., service activation server) or other network element can direct the creation of a service account, and optionally configure the device for use with the service account. First parameters associated with the device are received 900 at the service activation server. These first parameters may include, for example, those identified in item 800 of FIG. 8. Using one or more of the first parameters, the server derives 902 a list of service providers from a set of service providers, and this list is made available to the device as shown at block 904. For example, the list may be transmitted from the service activation server to the device, the list may be made available on an accessible web page(s) of the service activation server, etc. Second parameters are received 906 at the service activation server. These second parameters are associated with a service account established between the device and a device-selected, listed one of the service providers. In other words, a service account is created for the device with the service provider selected from the list, and at least some of the second parameters are associated with that newly created service account. Using the first and second parameters, the service activation server can create 908 configuration data, and make that configuration data available to the device. In this manner, the device can store the configuration data or otherwise be configured by the configuration data for use with the particular service account. Another option for the server is to create a contact record from information arising from the creation of the service account, and make this contact record available to the device as shown at block 910.

Figure 10:
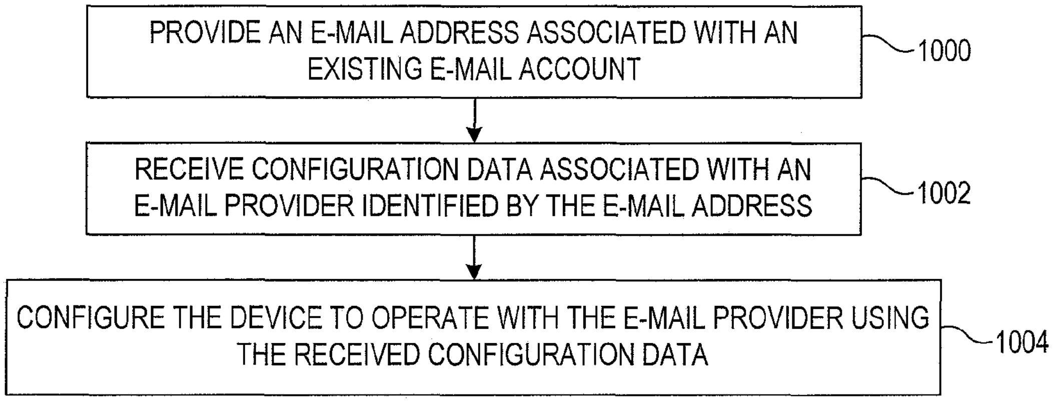
FIG. 10 is a flow diagram illustrating one representative manner in which a device can effect its configuration for use with an existing e-mail account.
Figure 11:
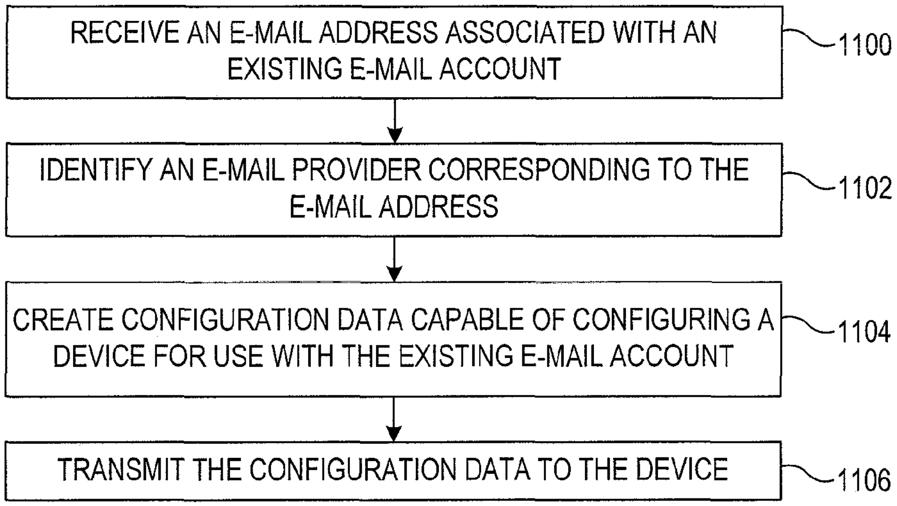
FIG. 11 is a flow diagram illustrating one representative manner in which a server or other network element can assist in the configuration of a device where an e-mail account already exists for the device user.

As previously noted, some embodiments of the invention do not involve the creation of a new service account, but rather involve the creation of a configuration document to configure a device for operation with an existing service account. FIGS. 10 and 11 are flow diagrams illustrating representative embodiments for configuring a device for operation with an existing service account. It should be recognized that FIGS. 10 and 11 equally apply to service accounts other than e-mail accounts.

More particularly, FIG. 10 is a flow diagram illustrating one representative manner in which a device (e.g., mobile phone, PDA, etc.) can effect its configuration for use with an existing e-mail account. An e-mail address associated with an existing e-mail account is provided 1000. For example, a mobile phone can transmit an e-mail address to the service activation server, or may enter an e-mail address via a website of the service activation server, etc. The e-mail address provided represents an e-mail address from an already-existing e-mail account. In response to providing this information, the device ultimately receives 1002 configuration data associated with an e-mail provider identified by the e-mail address. The device is configured 1004 to operate with the e-mail provider using the received configuration data.

It should also be noted that the device may further receive a contact record from the server relating to the user and corresponding e-mail address. In one embodiment, the user may be prompted whether or not he/she in fact wants to store a new contact record created using the user's existing e-mail (or other service) address. In some case, the user will already have a personal contact record and may not need to store such a contact record. The user can, by way of his/her user interface on the device, select to disregard receipt of any contact record for embodiments in which a contact record is made available to the user.

FIG. 11 is a flow diagram illustrating one representative manner in which a server (e.g., service activation server) or other network element can assist in the configuration of a device where an e-mail account already exists for the device user. An e-mail address associated with an existing e-mail account is received 1100 by the server. An e-mail provider corresponding to the e-mail address is identified 1102. A configuration document capable of configuring the device for use with the existing e-mail account is created 1104, and the configuration document is then transmitted 1106 to the device so that the device can effect the configuration. Again, in some embodiments, the server may also provide a contact record including at least some information associated with the user's existing account. In one embodiment, the server provides the user with an option as to whether or not he/she wants to store a contact record.

Figure 12:
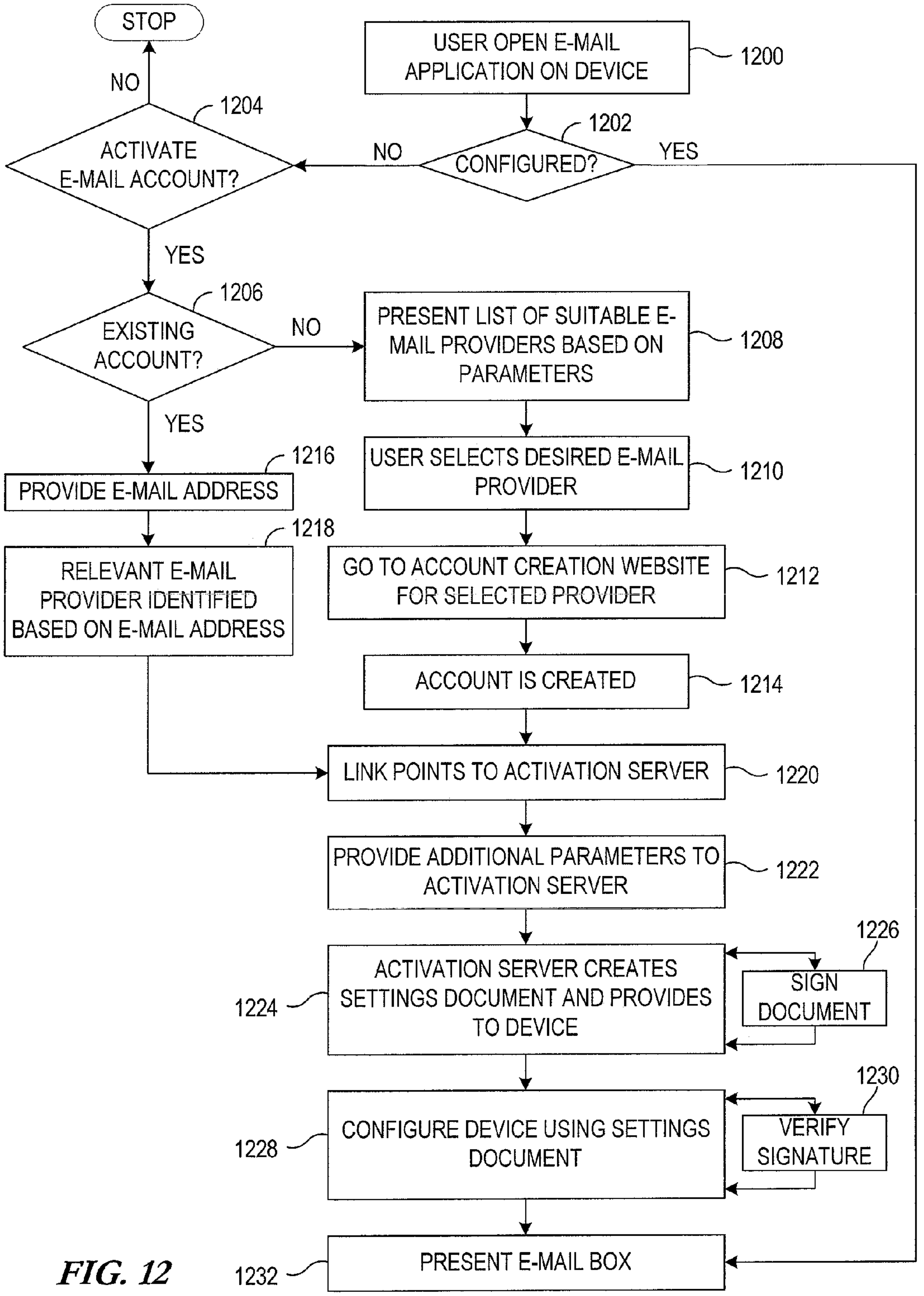
FIG. 12 is a flow diagram illustrating various embodiments of methods that involve a user choice whether a new service account is desired or whether an existing service account is to be used.

Numerous variations and options result in numerous embodiments of the invention. One embodiment involves the user's ability to choose whether a new service account is desired, or whether an existing service account is to be used. FIG. 12 is a flow diagram illustrating another embodiment of a method that involves this user choice. Again, while FIG. 12 is described in terms of an e-mail account, it is equally applicable to other service accounts.

The user attempts to open/launch 1200 an unconfigured e-mail application on the device. If the e-mail application is already configured as determined at decision block 1202, the device can access its e-mail box (e.g., Inbox) as shown at block 1232. If the application is not yet configured, the user may then get a prompt or other suggestion to activate e-mail as noted at block 1204. If the user opts to activate the unconfigured e-mail account, further steps depend on whether an existing e-mail account is to be used, or whether a new e-mail account is to be created. If there is no existing account, a list of suitable e-mail providers is presented 1208, where the list is based on parameters provided by the device to the service activation server. The user selects 1210 the desired provider from the list. In one embodiment, each of the providers in the list is associated with a respective URL or other address, and selection of a service provider from the list will cause the device to go to the account creation website for the selected provider as shown at block 1212. The account is created 1214 at the service activation server, which in turn provides 1220 a link to the device that points to the service activation server. Additional parameters are provided 1222 to the service activation server, which ultimately creates 1224 the settings document and provides it to the device. In one embodiment, the settings document is signed 1226 prior to providing it to the device. The device is then configured 1228 using the settings document. If the document is signed, the signature is verified 1230 prior to configuring the device. The device can then present its e-mail box or perform other functions associated with the now-configured e-mail client.

If there is an existing account as determined at decision block 1206, the user provides 1216 his/her e-mail address via to the service activation server. In response, the service activation server identifies 1218 the relevant e-mail provided based on the e-mail address, and the functions associated with items 1220-1232 can then be carried out.

Figure 13:
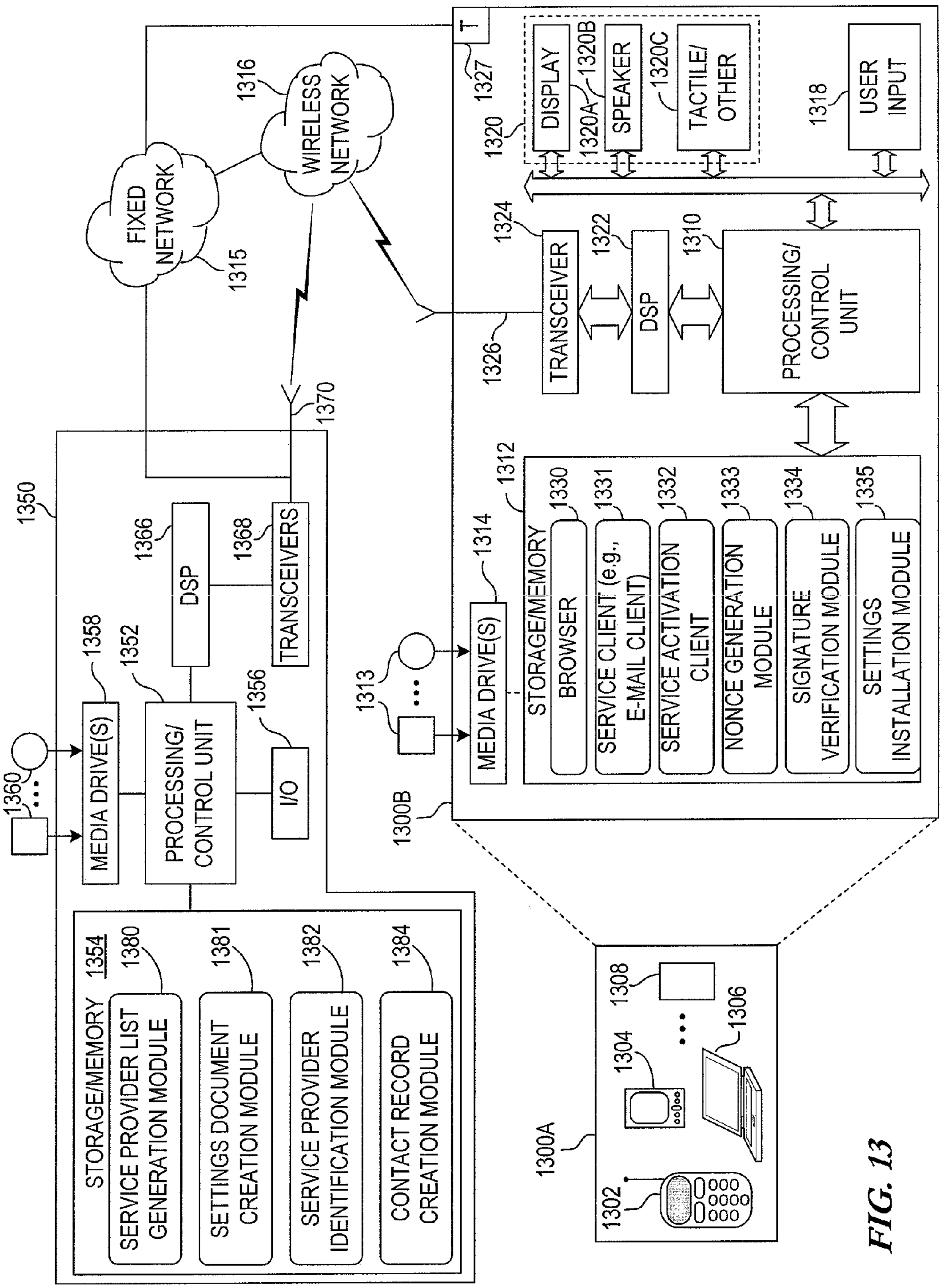
FIG. 13 illustrates a representative system in which the present invention may be implemented or otherwise utilized.

A representative system in which the present invention may be implemented or otherwise utilized is illustrated in FIG. 13. The communication device(s) 1300A represents any communication device capable of performing the device/handset functions previously described. In the illustrated embodiment, the device 1300A represents a mobile device capable of communicating over-the-air (OTA) with wireless networks and/or capable of communicating via wired networks. By way of example and not of limitation, the device 1300A includes mobile phones (including smart phones) 1302, personal digital assistants 1304, computing devices 1306, and other networked terminals 1308.

The representative terminal 1300A utilizes computing systems to control and manage the conventional device activity as well as the device functionality provided by the present invention. For example, the representative wireless terminal 1300B includes a processing/control unit 1310, such as a microprocessor, controller, reduced instruction set computer (RISC), or other central processing module. The processing unit 1310 need not be a single device, and may include one or more processors. For example, the processing unit may include a master processor and one or more associated slave processors coupled to communicate with the master processor.

The processing unit 1310 controls the basic functions of the terminal 1300B as dictated by programs available in the program storage/memory 1312. The storage/memory 1312 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the terminal. The storage 1312 may also include one or more of other types of read-only memory (ROM) and programmable and/or erasable ROM, random access memory (RAM), subscriber interface module (SIM), wireless interface module (WIM), smart card, or other fixed or removable memory device/media. The programs may also be provided via other media 1313, such as disks, CD-ROM, DVD, or the like, which are read by the appropriate interfaces and/or media drive(s) 1314. The relevant software for carrying out terminal operations in accordance with the present invention may also be transmitted to the terminal 1300B via data signals, such as being downloaded electronically via one or more networks, such as the data network 1315 or other data networks, and an intermediate wireless network(s) 1316 in the case where the terminal 1300A/1300B is a wireless device such as a mobile phone.

For performing other standard terminal functions, the processor 1310 is also coupled to user input interface 1318 associated with the terminal 1300B. The user input interface 1318 may include, for example, a keypad, function buttons, joystick, scrolling mechanism (e.g., mouse, trackball), touch pad/screen, or other user entry mechanisms (not shown).

A user interface (UI) 1320 may be provided, which allows the user of the terminal 1300A/B to perceive information visually, audibly, through touch, etc. For example, one or more display devices 1320A may be associated with the terminal 1300B. The display 1320A can display web pages, images, video, text, links and other information. A speaker (s) 1320B may be provided to audibly present instructions or other information. Other user interface (UI) mechanisms can also be provided, such as tactile 1320C or other feedback. The information associated with the present invention may be provided by any type of presentation perceivable by the user.

The exemplary mobile device 1300B of FIG. 13 also includes conventional circuitry for performing wireless transmissions over the wireless network(s) 1316. The DSP 1322 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1324 includes at least a transmitter and receiver, thereby transmitting outgoing radio signals and receiving incoming radio signals, generally by way of an antenna 1326. Where the device 1300B is a non-mobile or mobile device, it may include a transceiver (T) 1327 to allow other types of wireless, or wired, communication with networks such as the Internet. For example, the device 1300B may communicate via a proximity network (e.g., IEEE 802.11 or other wireless local area network), which is then coupled to a fixed network 1315 such as the Internet. Peer-to-peer networking may also be employed. Further, a wired connection may include, for example, an Ethernet connection to a network such as the Internet. These and other manners of ultimately communicating between the device 1300A/B and the server 1350 may be implemented.

In one embodiment, the storage/memory 1312 stores the various client programs and data used in connection with the present invention. For example, the storage/memory 1312 includes storage to store clients/applications such as the browser 1330, and the service client 1331 such as an e-mail client, photo sharing client, VoIP client, etc. Also included is the service activation client 1332, also referred to herein as the service activation wizard, which generally corresponds to the client 200 of prior figures. The storage 1312 may also include other modules, such as a nonce generation module 1333 and signature verification module 1334. A settings installation module 1335, which may be integral or distinct from the service activation client 1332, is provided to enable the device 1300B to be configured with the received settings document.

It should be recognized that the modules 1330-1335 may be separate modules operable in connection with the processor 1310, may be single module performing each of these functions, or may include a plurality of such modules performing the various functions. In other words, while the modules are shown as multiple software/firmware modules, these modules may or may not reside in the same software/firmware program. It should also be recognized that one or more of these functions may be performed using hardware. For example, a compare function may be performed by comparing the contents of hardware registers or other memory locations using hardware compare functions. These client and data modules are representative of the types of functional and data modules that may be associated with a terminal in accordance with the invention, and are not intended to represent an exhaustive list. Also, other functions not specifically shown may be implemented by the processor 1310.

FIG. 13 also depicts a representative computing system 1350 operable on the network. One or more of such systems 1350 may be available via a network(s) such as the wireless 1316 and/or fixed network 1315. In one embodiment, the computing system 1350 represents the service activation server as previously described. The server system 1350 may be a single system or a distributed system. The illustrated computing system/server 1350 includes a processing arrangement 1352, which may be coupled to the storage/memory 1354. The processor 1352 carries out a variety of standard computing functions as is known in the art, as dictated by software and/or firmware instructions. The storage/memory 1354 may represent firmware, media storage, and/or memory. The processor 1352 may communicate with other internal and external components through input/output (I/O) circuitry 1356. The computing system 1350 may also include media drives 1358, such as hard and floppy disk drives, CD-ROM drives, DVD drives, and other media 1360 capable of reading and/or storing information. In one embodiment, software for carrying out the operations at the computing system 1350 in accordance with the present invention may be stored and distributed on CD-ROM, diskette, magnetic media, removable memory, or other form of media capable of portably storing information, as represented by media devices 1360. Such software may also be transmitted to the system 1350 via data signals, such as being downloaded electronically via a network such as the data network 1315, Local Area Network (LAN) (not shown), wireless network 1316, and/or any combination thereof.

In accordance with one embodiment of the invention, the storage/memory 1354 and/or media devices 1360 store the various programs and data used in connection with the present invention. For example, the single or distributed service activation server 1350 includes an application or client shown as the service provider list generation module 1380 that generates the list of available service providers from the set of service providers based on the parameters provided by the device 1300B. The settings document creation module 1381 creates the settings document based on the parameters provided by one or both of the device 1300B and the service provider (not shown). The service provider identification module 1382 is used to identify a service provider (e.g., e-mail provider) given some information such as an e-mail address. The contact record creation module 1384 may be used to create a contact record, such as a vCard, based on a user-service identifier(s) resulting from the creation of a new service or known as a result of generating configuration information for the device 1300A.

The illustrated computing system 1350 also includes DSP circuitry 1366, and at least one transceiver 1368 (which is intended to also refer to discrete transmitter/receiver components). While the server 1350 may communicate with the data network 1315 via wired connections, the server may also/instead be equipped with transceivers 1368 to communicate with wireless networks 1316 whereby an antenna 1370 may be used.

Hardware, firmware, software or a combination thereof may be used to perform the functions and operations in accordance with the invention. Using the foregoing specification, some embodiments of the invention may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device.

For example, one embodiment of the invention includes a computer-readable medium having instructions stored thereon that are executable by a computing system for creating a service account capable of use by a communication device. The instructions enable identification of one or more device parameters to be transmitted, and facilitate the presentation of a list of one or more service providers, where the list is derived, using one or more of the parameters, from a set of service providers. The instructions further facilitate user selection of at least one of the service providers in the list, and enable communication with the selected service provider to create a service account with the selected service provider From the description provided herein, those skilled in the art are readily able to combine software created as described with appropriate general purpose or special purpose computer hardware to create a computing system and/or computing subcomponents embodying the invention, and to create a computing system and/or computing subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:

in response to a user attempt to launch an un-configured application client at a mobile device, randomly generating a nonce code at the device based on a key built in a client software in the device for signing and verification in a nonce-based asymmetric encryption scheme, and initiating, by the device, a transmission of a provisioning request including one or more parameters of the device to a service activation server, wherein the one or more parameters include the nonce code and at least one of a device location, a device home network, a device type, and a device language;

receiving, at the device via an email service provider list page hosted by the service activation server, a list of one or more service providers that support the at least one of the device location, the device home network, the device type, and the device language, the list being derived, using one or more of the parameters, from a set of service providers;

receiving, at the device, a user-selection of one of the service providers in the list;

facilitating communication between the device and the selected service provider under the nonce-based asymmetric encryption scheme to create a service account with the selected service provider for a user of the device, wherein the communication includes additional parameters of the service account established between the device and the selected service provider;

receiving, at the device, configuration data associated with the selected service provider based on the one or more parameters and the additional parameters at the device, wherein the configuration data is used for configuration of the application client and the device; and configuring the device to operate with the selected service provider using the received configuration data.

2. The method according to claim 1, further comprising:

presenting a selectable option for at least one of the following:

create a new service account or bypass creation of a new service account and configure an existing service account for use on the device; and authenticating, at the device, the configuration data by verifying a signature of the service activation server that is included in the configuration data using the nonce code.

3. The method according to claim 2, further comprising:

recognizing selection of the option to configure an existing service account for use on the device, and in response providing a service account identifier indicative of an existing service provider of the existing service account.

4. The method according to claim 3, wherein the existing service account comprises an existing e-mail account, wherein providing a service account identifier indicative of the existing service provider of the existing service account comprises providing an e-mail address associated with the existing e-mail account, and wherein the signature is signed with a key of the service activation server in the nonce-based asymmetric encryption scheme.

5. The method according to claim 3, further comprising:

redirecting communication to the existing service provider to authenticate a user of the device for the existing service account, wherein receiving configuration data associated with the existing service provider comprises receiving the configuration data if the user of the device is authenticated for the existing service account.

6. The method according to claim 1, further comprising:

including a network address of each of the service providers in the list, wherein the communication with the selected service provider comprises initiating, by the device, a transmission of a uniform resource locator of the selected service provider to the selected service provider, wherein the network address of the respective service provider links to a service account creation page of the respective service provider.

7. The method according to claim 1, wherein the communication with the selected service provider comprises directing a browser application on the device to a network address of the selected service provider to create the service account with the selected service provider.

8. The method according to claim 1, wherein the communication with the selected service provider further comprises:

presenting, at the device, one or more web pages provided by the selected service provider;

receiving entry of account data associated with the device, the user of the device, or a combination thereof; and initiating a transmission of the account data via the one or more web pages to the selected service provider to facilitate the creation of the service account.

9. The method according to claim 1, wherein the transmission of the one or more parameters of the device comprises automatically transmitting the one or more parameters with a request to create the service account in response to an attempt to invoke a client not yet configured for use with the selected service provider.

10. The method according to claim 1, further comprising configuring the device with the configuration data obtained in response to the creation of the new service account.

11. The method according to claim 1, further comprising receiving a contact record including at least a user-service identifier identifying a user of the device for the created service account, and storing the received contact record in a contacts database.

12. The method according to claim 1, wherein the key built in the client software in the device corresponds to a generation of the device among a plurality of device generations, and the method further comprising:

receiving, at the device, the configuration data signed with a key of the service activation server;

using another key built in the client software in the device to decrypt the configuration data at the device, wherein the another key is paired with the key corresponding to the generation of the device;

creating, at the device, a contact record including at least a received user-service identifier identifying a user of the device for the created service account, and storing the created contact record in a contacts database.

13. The method according to claim 1, further comprising receiving a contact record including at least identification information resulting from the creation of the service account, and modifying at least one existing local contact record with the information from the received contact record.

14. A method comprising:

receiving, at a service activation server from a mobile device, a provisioning request including one or more first parameters of the device in response to a user attempt to launch an un-configured application client at the device, wherein the one or more first parameters include at least one of a device location, a device home network, a device type, and a device language, and a parameter of a key to be used by the device to sign and verify in a nonce-based asymmetric encryption scheme, wherein the key is built in an application in the device and corresponds to a generation of the device among a plurality of device generations;

deriving, by the service activation server, a list of one or more email service providers, that support the at least one of the device location, the device home network, the device type, and the device language, from a set of service providers using at least the parameter of the key;

providing, via a provider list page hosted by the service activation server, the list to the device;

receiving, by the service activation server via the provider list page from the device, second parameters associated with a service account established between the device and a selected service provider which has been selected from the list;

associating, by the service activation server, the second parameters with the service account; and creating, by the service activation server, configuration data associated with the selected service provider based on the first and second parameters and providing the configuration data under the nonce-based asymmetric encryption scheme to the device, wherein the configuration data is used for configuration of the application client and the device to operate with the selected service provider.

15. The method according to claim 14, further comprising:

signing the configuration data with a key of the service activation server paired with the key to be used by the device to sign and verify in the nonce-based asymmetric encryption scheme;

transmitting the configuration data as signed to the device;

creating a contact record including at least a user-service identifier corresponding to the established service account, and providing the contact record to the device, wherein the second parameters include an e-mail address, a username, an internet message access protocol server address, an internet message access protocol server type, a simple mail transfer protocol server address, a simple mail transfer protocol server type, or a combination thereof, associated with the selected service provider.

16. The method according to claim 15, wherein the one or more first parameters further include a nonce code randomly generating at the device in the nonce-based asymmetric encryption scheme, and the method further comprising:

providing to the device at least one software module related to the service associated with the established service account;

signing the configuration data with the key of the service activation server in the another asymmetric encryption scheme; and transmitting the configuration data as signed to the device.

17. The method according to claim 15, wherein the second parameters support simple mail transfer protocol server configurations for a general packet radio service access point and simple mail transfer protocol server configurations for a wireless local area network access point.

18. The method according to claim 14, further comprising:

invoking a test mode testing a new service provider that is new to the service activation server in response to receiving a test identifier of the new service provider, while concealing the new service provider being tested from the derived list and lists for other mobile devices, and testing for proper service establishment prior to including the new service provider in the derived list and the lists for the other mobile devices.

19. The method according to claim 14, further comprising:

invoking, by the service activation server, a setup assistant application on the mobile device to download software to the mobile device in conjunction with configuring the un-configured application client, wherein the software is required for operating the application client.

20. A apparatus, comprising:

at least one processor; and at least one memory including computer program code for one or more programs, the at least one memory and the computer program code configured to, with the at least one processor, cause the apparatus embedded in a mobile device to perform at least the following:

in response to a user attempt to launch an un-configured application client at a mobile device, randomly generate a nonce code at the device based on a key built in a client software in the device for signing and verification in a nonce-based asymmetric encryption scheme, and initiating a transmission of a provisioning request including one or more parameters of the device to a service activation server, wherein the one or more parameters include the nonce code and at least one of a device location, a device home network, a device type, and a device language;

receive, via an email service provider list page hosted by the service activation server, a list of one or more service providers that support the at least one of the device location, the device home network, the device type, and the device language, the list being derived, using one or more of the parameters, from a set of service providers;

receive a user-selection of one of the service providers in the list;

facilitate communication between the device and the selected service provider under the nonce-based asymmetric encryption scheme to create a service account with the selected service provider for a user of the device, wherein the communication includes additional parameters of the service account established between the device and the selected service provider;

receive configuration data associated with the selected service provider based on the one or more parameters and the additional parameters at the device, wherein the configuration data is used for configuration of the application client and the device; and configure the device to operate with the selected service provider using the received configuration data.

* * * * *